United States Patent
Bass et al.

(10) Patent No.: US 10,705,403 B1
(45) Date of Patent: Jul. 7, 2020

(54) CHARGE SEQUESTRATION METHODS FOR ELECTROCHROMIC DEVICES

(71) Applicant: Kinestral Technologies, Inc., South San Francisco, CA (US)

(72) Inventors: John Bass, South San Francisco, CA (US); Hugues Duncan, South San Francisco, CA (US); Jonathan Ziebarth, South San Francisco, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 195 days.

(21) Appl. No.: 15/841,097

(22) Filed: Dec. 13, 2017

Related U.S. Application Data

(60) Provisional application No. 62/433,575, filed on Dec. 13, 2016.

(51) Int. Cl.
| | | |
|---|---|---|
| G02F 1/163 | (2006.01) | |
| G02F 1/155 | (2006.01) | |
| E06B 3/67 | (2006.01) | |
| E06B 9/24 | (2006.01) | |
| B32B 17/10 | (2006.01) | |

(52) U.S. Cl.
CPC ............ *G02F 1/163* (2013.01); *E06B 3/6722* (2013.01); *E06B 9/24* (2013.01); *G02F 1/155* (2013.01); *B32B 17/10513* (2013.01); *E06B 2009/2464* (2013.01)

(58) Field of Classification Search
CPC ........ G02F 1/163; G02F 1/155; E06B 3/6722; E06B 9/24; E06B 2009/2464; B32B 17/10513

USPC .......................................................... 359/275
See application file for complete search history.

(56) References Cited

U.S. PATENT DOCUMENTS

| | | | | |
|---|---|---|---|---|
| 3,961,842 A * | 6/1976 | Jasinski | ................... | G02F 1/163 |
| | | | | 359/266 |
| 4,181,406 A * | 1/1980 | Kohara | ................. | G02F 1/1503 |
| | | | | 359/269 |
| 4,436,380 A * | 3/1984 | Yano | ..................... | G02F 1/1523 |
| | | | | 359/269 |
| 6,614,577 B1 * | 9/2003 | Yu | .......................... | G02F 1/163 |
| | | | | 351/44 |
| 8,547,622 B2 * | 10/2013 | Tonar | ..................... | B60R 1/084 |
| | | | | 359/245 |
| 8,937,758 B2 * | 1/2015 | Kim | ....................... | G02F 1/163 |
| | | | | 359/273 |
| 10,372,005 B2 * | 8/2019 | Kubo | .................... | G02F 1/1503 |
| 2012/0081773 A1 * | 4/2012 | Yeh | ....................... | G02F 1/1525 |
| | | | | 359/265 |
| 2012/0224246 A1 * | 9/2012 | Yeh | ....................... | G02F 1/1533 |
| | | | | 359/265 |

(Continued)

*Primary Examiner* — Collin X Beatty
(74) *Attorney, Agent, or Firm* — Womble Bond Dickinson (US) LLP

(57) ABSTRACT

A method of controlling an electrochromic device is provided. The method includes measuring an open circuit voltage between a first electrode and a reference electrode in the electrochromic device in a fully bleached state. The method includes calculating a charge Q to return the first electrode to a baseline state and darkening the first electrode in the electrochromic device to a darkened state. The method includes transferring charge from the first electrode in the darkened state to a redox element.

14 Claims, 18 Drawing Sheets

(56) References Cited

U.S. PATENT DOCUMENTS

2014/0146381 A1\* 5/2014 Chen .................. G02F 1/15
359/265
2014/0236323 A1\* 8/2014 Brown ................ G02F 1/163
700/90

\* cited by examiner

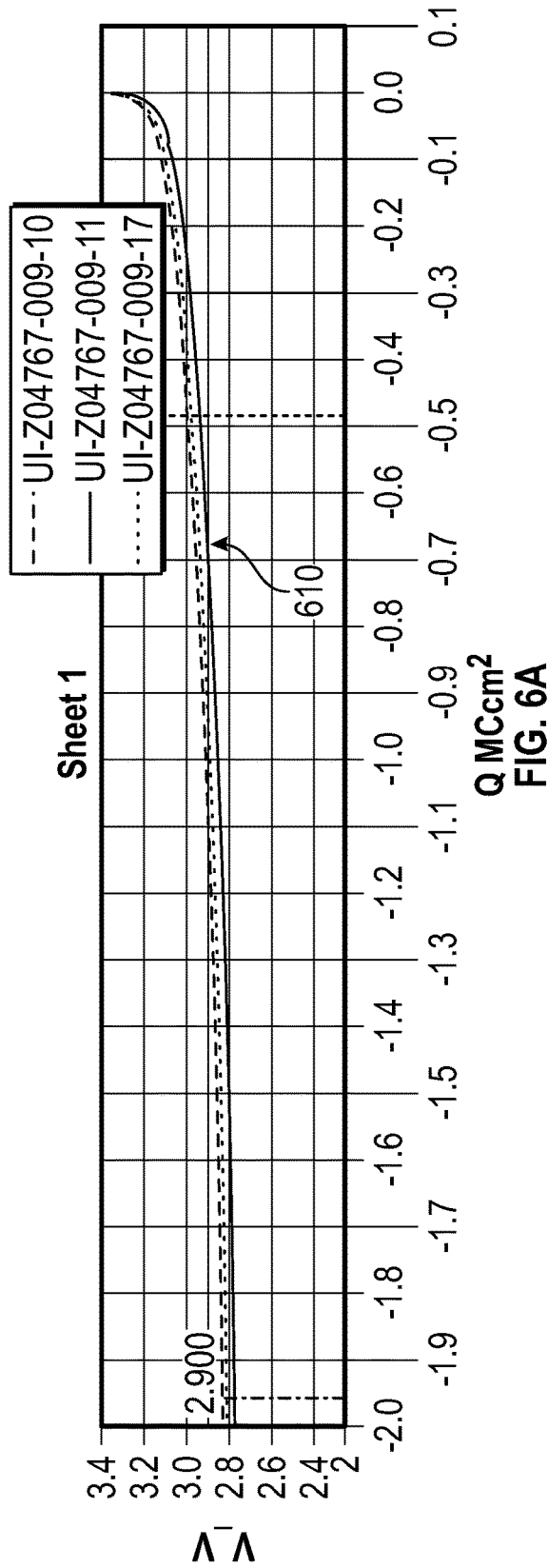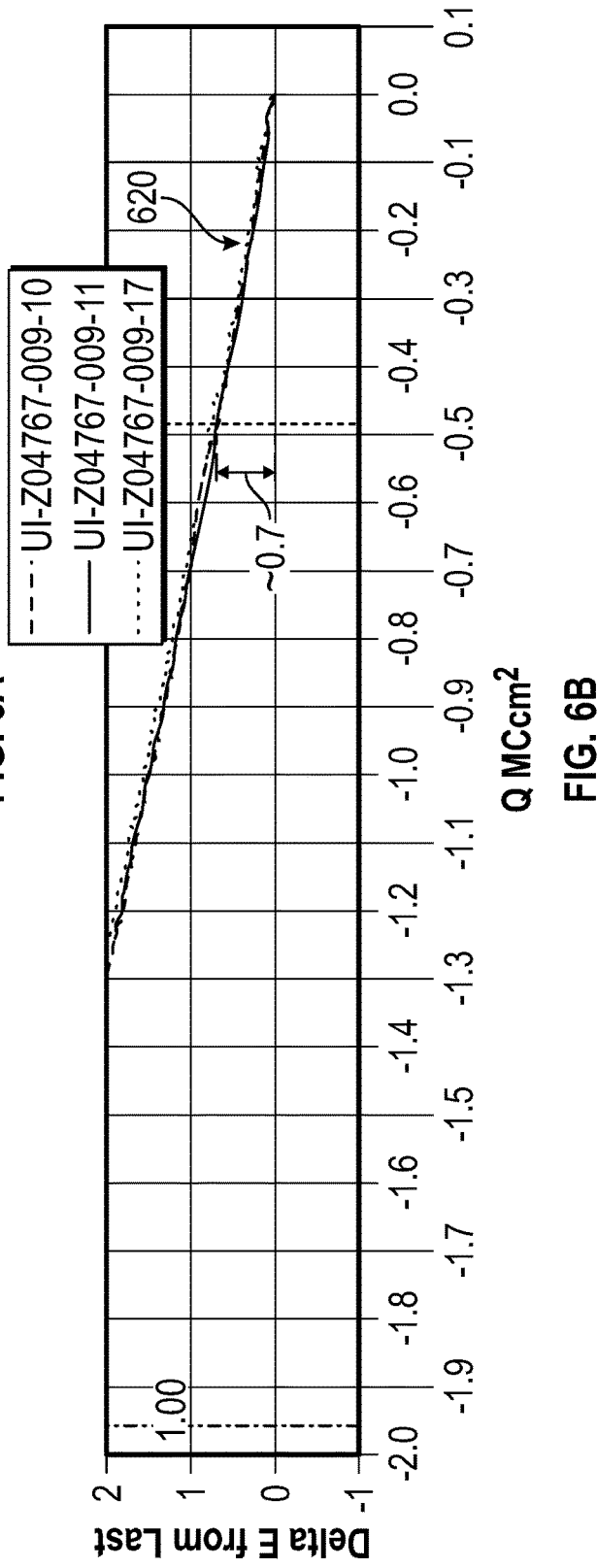

After UV Exposure

After Sequestration Protocol

CHARGE SEQUESTRATION METHODS FOR ELECTROCHROMIC DEVICES

FIELD OF THE INVENTION

The present disclosure generally relates to electrochromic devices, and in particular electrochromic windows, that tint from a clear state to a darker more tinted state. These windows may be used in architectural or vehicular applications. In particular the present disclosure describes an electrochromic device that includes a redox element configured to sequester excess charge to optimize the performance of the electrochromic device.

BACKGROUND

Electrochromic devices typically utilize a combination of two types of electrochromic materials, one of which becomes optically less transmissive (e.g., takes on color) in its electrochemically oxidized state while the other becomes optically less transmissive (e.g., takes on color) in its electrochemically reduced state. For example, Prussian blue assumes a blue color in its electrochemically oxidized state and becomes colorless by reduction while tungsten trioxide $WO_3$, assumes a blue color in its electrochemically reduced state and becomes colorless by oxidation. When the two are used as separate electrochromic layers separated by an ion conductor layer in a multi-layer stack, the stack may be reversibly cycled between a blue color (when the Prussian blue material is in its electrochemically oxidized state and tungsten trioxide is in its reduced state) and a transparent state (when the Prussian blue material is in its electrochemically reduced state and tungsten trioxide is in its electrochemically oxidized state) by application of an appropriate voltage across the stack.

Faradaic losses can degrade the performance of reversible electrochromic devices. For example, a faradaic loss may be caused during cycling by a reaction between the electrolyte and an oxidizing electrode surface, by a photochemical oxidation reaction, or by any of a range of other spurious oxidation mechanisms involving water, oxygen, and/or a component of an ion conducting material (e.g., an ion conductor layer). These faradaic losses can, in turn, result in a corresponding change in the oxidation state of an electrochromic material in the device. The faradaic losses can occur in the electrochromic material that becomes optically less transmissive in its electrochemically oxidized state, the electrochromic material that becomes optically less transmissive in its electrochemically reduced state, or both. Over time and repeated cycling, the accumulated faradaic losses can cause a drift in the range of optical transmissivities achievable for the device within the desired operating voltage range.

In certain types of electrochromic devices, durability is a major challenge. As the device ages the performance suffers. The transmission in the colored and bleached states can change, the capacity (charge stored in the device in a given state) can change, and the ratio of the transmittance of the device in the bleached state versus the colored state over the visible range of the electromagnetic spectrum can also change. These changes can be large, and easily perceptible to the user of the electrochromic device. The rates of degradation can also be affected by many factors, including but not limited to temperature, applied bias ranges, rate of switching, and intensity and duration of incident solar radiation.

What is therefore desired are electrochromic device architectures, materials, and control schemes that enable an electrochromic device with faradaic losses (i.e., spurious oxidation and/or reduction) to maintain the electrochromic properties throughout the lifetime of the device. Furthermore, the device architectures, materials and control schemes employed should be able to be readily manufacturable into commercially viable products.

BRIEF DESCRIPTION OF THE DRAWINGS

To facilitate further description of the embodiments, the following drawings are provided in which.

Figure 1:
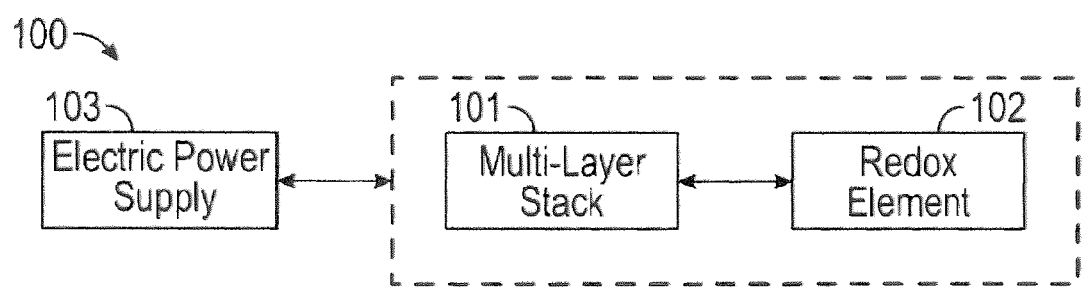
FIG. 1 is a block diagram of an electrochromic device.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

Abbreviations and Definitions

The term "anodic electrochromic material" refers to an electrochromic material that changes from a less optically transmissive state to a less optically transmissive state (e.g., darkens) upon oxidation (i.e., removal of electrons).

The term "cathodic electrochromic material" refers to an electrochromic material that changes from a less optically transmissive state to a more optically transmissive state (e.g., darkens) upon reduction (i.e., addition of electrons).

The term "electrochromic material" refers to a material that is able to change its optical properties as a result of the insertion or extraction of ions and electrons. For example, an electrochromic material may change between (i) a colored, translucent or opaque state and a transparent state or (ii) a colored, opaque state and a colored, translucent state. In some examples, the change can be reversible while in other examples, the change can be irreversible.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The terms "couple," "coupled," "couples," "coupling," and the like should be broadly understood and refer to connecting two or more elements or signals, electrically, ionically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time (e.g., permanent or semi-permanent or only for an instant).

DETAILED DESCRIPTION

Embodiments of the current invention describe a charge sequestration method that may be used to remove, or sequester, excess charge from one or more layers of an electrochromic device. The electrochromic devices described herein may switch between different optical transmittance states, or in other words they may switch between clearer (more bleached) states and darker (more darkened states) to provide windows for various applications that may tint from an optically clear state (the bleached state) to a tinted or darkened state. For convenience of description herein, change of the one or more optical properties of electrochromic devices (i.e., switching or cycling of the electrochromic devices) is primarily discussed as occurring between a pair of optical states (i.e., an optically less transmissive state and an optically more transmissive state), but it should be understood that these are merely examples and relative terms. For example, the optically less and more transmissive states can be a pair of optical states between a pair of more extreme optically less and more transmissive states that are attainable by a specific electrochromic device. Further, there could be any number of optical states between the optically less and more transmissive states.

There are different metrics for the optical and electrical performance of an electrochromic window. In the more transmissive state, or bleached state, the transmission in the visible spectrum is a key metric. In some cases the transmission across the visible spectrum can be weighted by the spectral sensitivity of the human eye, and is referred to in this disclosure as "Tvis". A figure of merit for the transmission is the percent transmission at 550 nm, which is close to the peak response of the human eye, and is referred to in this disclosure as "T550". The transmittance of the device in the less transmissive state, or darkened state, is also an important metric.

Embodiments of this invention describe a charge sequestration method using an electrochromic (EC) device having a redox element. The term "redox" is short for reduction-oxidation reaction, which is a reaction where the oxidation states of atoms are changed. In the context of the invention a redox element may be part of any of the electrochromic devices described herein that can cause a reduction-oxidation, or redox, reaction. The redox element sequesters charge from one or more layers of the electrochromic device by either oxidizing or reducing the charge from one or more of the layers of the electrochromic device. In some cases, the redox element sequesters charge to mitigate or prevent performance degradation of the electrochromic device resulting from faradic losses. In some cases, the redox element sequesters charge to mitigate or prevent a decrease in the photopic transmittance ratio of the electrochromic device. The "photopic transmittance ratio" (i.e. the "photopic ratio") is the transmittance of the electrochromic device in the bleached state divided by the transmittance of the electrochromic device in the darkened state over the visible range of the electromagnetic spectrum (e.g., wavelengths of electromagnetic radiation greater than or equal to approximately 380 nanometers and less than or equal to approximately 780 nanometers), weighted by a photopic sensitivity curve (i.e., an average sensitivity of a human eye).

The photopic transmittance ratio can refer to the transmittance of multi-layer stack 101 in the more optically transmissive state versus the less optically transmissive state over the visible range of the electromagnetic spectrum (e.g., wavelengths of electromagnetic radiation greater than or equal to approximately 380 nanometers and less than or equal to approximately 780 nanometers) weighted by a photopic sensitivity curve (i.e., an average sensitivity of a human eye). The photopic transmittance Ts(p) for a given optically transmissive state can be calculated by Equation (1) as follows:

$$\tau_s(p) = \frac{\int_{\lambda_{min}}^{\lambda_{max}} \tau_s(\lambda) I_p(\lambda) d\lambda}{\int_{\lambda_{min}}^{\lambda_{max}} I_p(\lambda) d\lambda} \quad (1)$$

where $\lambda max$ is the maximum wavelength of the visible range (e.g., 780 nanometers), $\lambda min$ is the minimum wavelength of the visible range (e.g., 380 nanometers), Ts($\lambda$) is the transmittance of multi-layer stack 101 in a given state at any wavelength in the visible range, and IP($\lambda$) is the photopic intensity function.

Accordingly, the photopic transmittance ratio can be represented by Expression (2) as follows:

$$\frac{\tau_m(p)}{\tau_l(p)} \qquad (2)$$

where

Tm(p) is the photopic transmittance in the more optically transmissive state and Tl(p) is the photopic transmittance in the less optically transmissive state.

Electrochromic devices with redox elements are described in US2016/0202588A1, which is incorporated herein by reference. Drive schemes for electrochromic devices with redox elements are described in US 2016/0202590, which is incorporated herein by reference. Device construction and circuit connections for electrochromic devices with redox elements is described in U.S. application Ser. No. 15/230,157, which is incorporated herein by reference.

FIG. 1 illustrates a representative block diagram of an electrochromic device 100, according to an embodiment. Electrochromic device 100 is merely exemplary and is not limited to the embodiments presented herein. Electrochromic device 100 can be employed in many different embodiments or examples not specifically depicted or described herein.

Electrochromic device 100 includes multi-layer stack 101, redox element 102, and in some embodiments, electric power supply 103. In general, electrochromic device 100 has a first electrode layer and a second electrode layer separated by an ion conductor which ionically couples the first and second electrode layers. At least one of the first and second electrode layers has an electrochromic material thereby enabling the device to reversibly cycle between an optically less transmissive state and an optically more transmissive state upon the application of an appropriate potential to the electrodes. The multi-layer stack is capable of reversibly cycling between an optically less transmissive state and an optically more transmissive state in response to an electrical potential applied to the multi-layer stack. The multi-layer stack includes, in succession, a first substrate, a first electrically conductive layer, a first electrode layer electrically coupled to the first electrically conductive layer and has a first electrode material, an ion conductor layer, a second electrode layer with a second electrode material, a second electrically conductive layer electrically coupled to the second electrode layer, and a second substrate. The first electrode material and/or the second electrode material is made up of an electrochromic material and at least one of the first and second substrates is optically transparent.

In some aspects of the present disclosure, the redox element is an active redox element. Active redox elements sequester charge from the other layers of the electrochromic device in response to a potential applied through one or more auxiliary electrodes coupled to auxiliary control circuitry. The auxiliary electrode may apply a sequestration potential to the electrochromic device. The auxiliary electrode can apply the sequestration potential independently from the potential that is applied to the anode and cathode of the EC device to switch the EC device from a more transmissive state to a less transmissive state.

Figure 2:
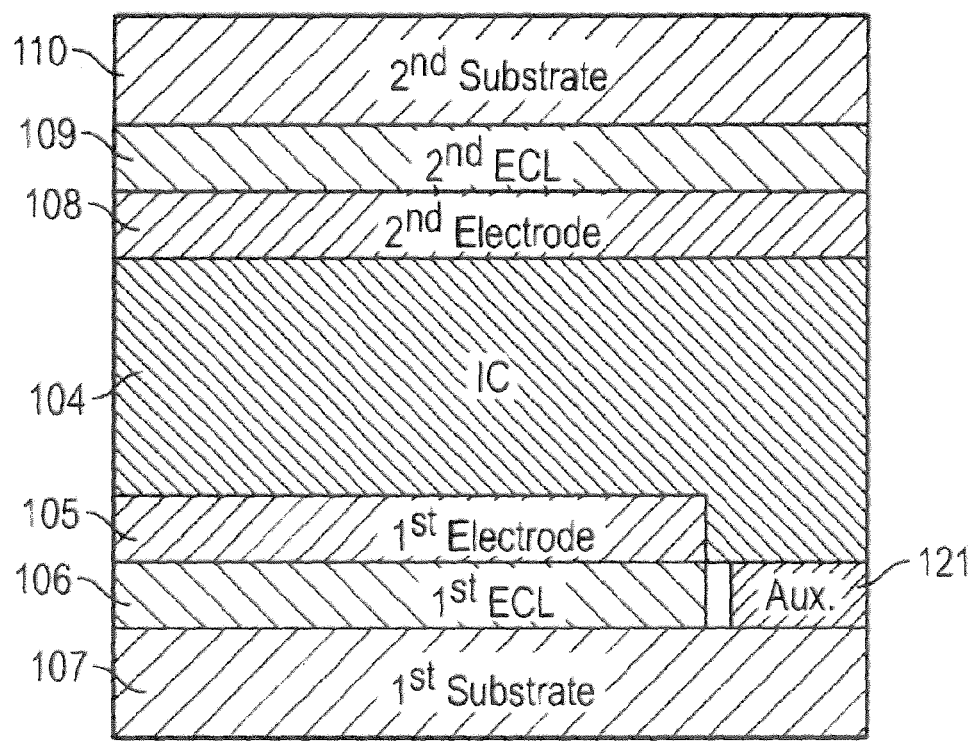
FIG. 2 is a schematic cross-section of a multi-layer electrochromic device with an active redox element.

FIG. 2 schematically illustrates an embodiment of an electrochromic device that may perform active sequestration. This embodiment of the electrochromic device has an active redox element in which an auxiliary electrode 121 is electrically isolated from the first and second electrically conductive layers (ECLs) 106 and 109. In some embodiments, the auxiliary electrode 121 is located on the first substrate 107 along with the first electrically conductive layer (ECL) 106. In this embodiment, the auxiliary electrode 121 is in ionic communication with the ion conductor (IC) 104, which is in ionic communication with both the first and second electrode layers 105 and 108 (i.e., the anode and the cathode of the EC device). In another embodiment, the auxiliary electrode 121 is located on the second substrate 110 along with the second ECL 109. In this embodiment, the first and second electrically conductive layers (ECLs) 106 and 109 apply the potential to the first and second electrode layers 105 and/or 108 (i.e., the anode and/or cathode of the EC device) to switch the EC device from a more transmissive state to a less transmissive state (or a less transmissive state to a more transmissive state), and the auxiliary electrode applies a sequestration potential whereby the material comprising the auxiliary electrode 121 sequesters charge from the first and/or second electrode layer(s) 105 and/or 108 (i.e., the anode and/or cathode of the EC device).

Figure 3:
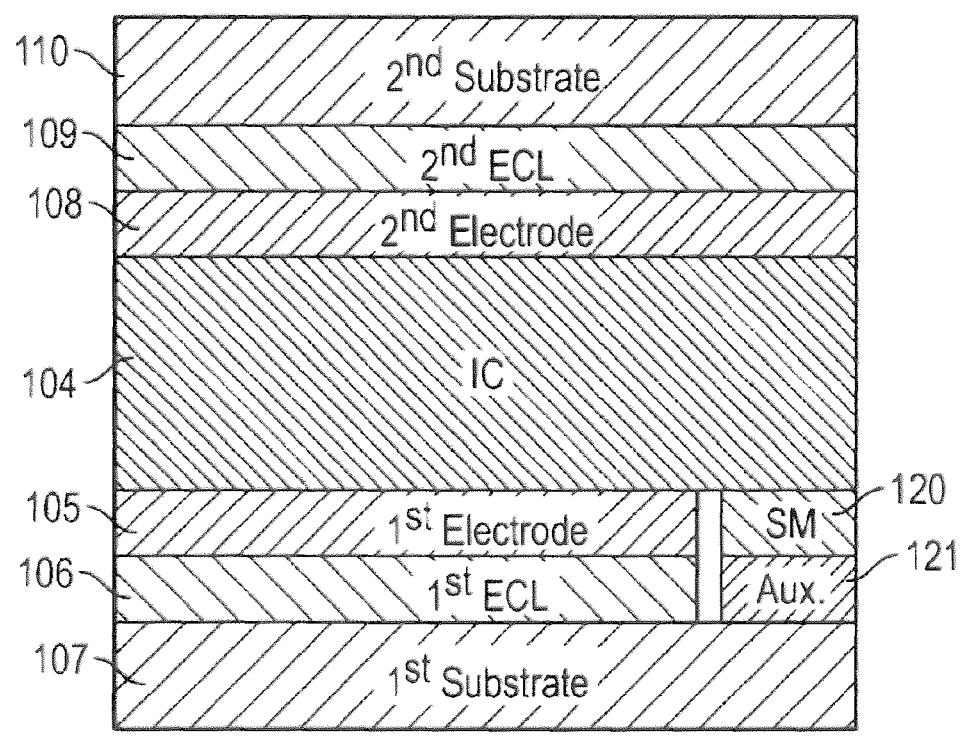
FIG. 3 is a schematic cross-section of a multi-layer electrochromic device with an enhanced active redox element.

FIG. 3 schematically illustrates an embodiment of an electrochromic device 100 having enhanced active redox elements. In this embodiment, an enhanced active redox element has both a sequestration material (SM) 120 and an auxiliary electrode 121 that are in electrical contact with one another, and are electrically isolated from the first and second electrically conductive layers (ECLs) 106 and 109. In some embodiments, the SM 120 and the auxiliary electrode 121 are located on the first substrate 107 along with the first ECL 106. In some embodiments, the SM 120 and the auxiliary electrode 121 are located on the second substrate 110 along with second ECL 109. In this embodiment, the SM 120 is in ionic communication with the ion conductor (IC) 104, which is in ionic communication with both the first and second electrode layers 105 and 108 (i.e., the anode and the cathode of the EC device). The first and second electrically conductive layers (ECLs) 106 and 109 apply the potential to the first and second electrode layers 105 and/or 108 (i.e., the anode and/or cathode of the EC device) to switch the EC device from a more transmissive state to a less transmissive state (or a less transmissive state to a more transmissive state), and the auxiliary electrode delivers a sequestration potential to the SM 120 whereby the SM 120 sequesters charge from the first and/or second electrode layer(s) 105 and/or 108 (i.e., the anode and/or cathode of the EC device).

In general, the sequestration material (SM) or auxiliary electrode can be oxidized or reduced in a redox reaction in response to an electrical potential applied to the multi-layer stack. In general, the sequestration material (SM) or the materials comprising the auxiliary electrode can be oxidized or reduced in a redox reaction in response to an electrical potential applied to the multi-layer stack by accepting ionic species (e.g., $H^+$ or $Li^+$). In some cases, the redox element can be both reducible and oxidizable to correct for both spurious oxidation and/or spurious reduction. In some cases, the redox element can be reducible and oxidizable to correct for spurious oxidation and/or reduction in the anode and/or cathode.

Over its life, electrochromic device 101 may experience faradaic losses due to the spurious oxidation and/or reduction in the device. For example, the electrochromic device may experience faradaic losses as a result of a photochemical oxidation reaction, by means of a reaction between the electrolyte and an oxidizing electrode surface during cycling between the optically less transmissive and optically more transmissive states, or by any of a range of other spurious oxidation mechanisms involving water, oxygen, and/or a component of an ion conducting material (e.g., an ion conductor layer). Advantageously, redox element 102 has the capacity to compensate for such faradaic losses over the lifetime of the electrochromic device.

For example, spurious oxidation can result at multi-layer stack 101 from (i) reactions of water, oxygen, and/or the ion conductor and one of the electrodes of multi-layer stack 101 (i.e., oxidation of the ion conductor) and/or (ii) photochemical oxidation of water and/or the ion conductor of multi-layer stack 101 as multi-layer stack 101 is repeatedly cycled between the optically less and more transmissive states. In these embodiments, the auxiliary electrode can be selectively reduced to compensate for (e.g., offset) this spurious oxidation that would otherwise reduce one of the electrodes of multi-layer stack 101 and throw off the operating electrical potential range of multi-layer stack 101, the open-circuit electrical potentials corresponding to one or more of the states of charge of multi-layer stack 101, and/or the range of the states of charge of multi-layer stack 101 corresponding to the optically transmissive states from the optically less transmissive state to the optically more transmissive state.

An aspect of the present disclosure is the provision of a process for compensating for faradic losses in an electrochromic device comprising a redox element and a multi-layer stack. This process can include adjusting the oxidation state of the first and/or second electrode layer relative to the redox element to compensate for faradaic losses that arise over time as the electrochromic device is reversibly cycled between the optically less transmissive and optically more transmissive states. This process can also include cycling the multi-layer device between an optically less transmissive state and an optically more transmissive state and sequestering charge from the first and/or second electrode layer to the redox element to compensate for faradaic losses as the electrochromic device is reversibly cycled between the optically less transmissive and optically more transmissive states.

In some embodiments of the current invention, the sequestration protocol includes one or more of the following features: 1) fully bleaching the electrochromic device and measuring the state of one or more electrodes in the bleached (or clear) state, then darkening and sequestering charge from the one or more electrodes into the redox element in the darkened state; 2) measuring the state of the one or more electrodes using a reference electrode (where in some cases there is a separate dedicated reference electrode and in some cases the redox element is the reference electrode); and 3) sequestration performed in one or more cycles, where each cycle includes a sequestration step followed by a equilibration step, to enable improved spatial uniformity of the device optical transmission.

In some embodiments, the sequestration method is performed in the following way. First the electrochromic device is fully bleached and the cathode has minimal mobile $Li^+$ present, and the open circuit voltage (OCV) is measured between the cathode and a reference electrode. The term "fully bleached state" as used in connection with a cathodic electrochromic material refers to the state of the cathodic electrochromic material when the material is held at 3.4 V with respect to $Li/Li^+$ for a time period greater than or equal to 1 hour at 85° C. in an electrochemical half-cell in a propylene carbonate solution containing 1 M lithium perchlorate (under anhydrous conditions and in an Ar atmosphere). In some embodiments, the cathodic electrochromic material is in a multi-layer stack of an EC device, and the magnitude and duration of the applied potential that is required to achieve the fully bleached state, as defined above, may be influenced by the other layers in the multi-layer stack of the EC device. When the device is fully bleached a measurement of the OCV drift can be made. OCV drift is defined as the difference between the measured OCV (between the electrode and the reference electrode), and the OCV (between the electrode and the reference electrode) of the baseline state. The baseline state is a state with desirable optical transmission and color, and a defined potential with respect to the reference electrode in the fully bleached state. If the OCV has drifted (e.g., due to faradaic losses) beyond a certain threshold, then an amount of charge Q that is necessary to return the cathode to the baseline state is calculated. Next, the EC device is switched into the darkened state, and once in the darkened state the charge is sequestered from the cathode into the redox element. In some cases, performing the sequestration in the darkened state mitigates the possibility of photooxidation of one or more layers in the multi-layer stack occurring during the sequestration event. In some cases, performing sequestration in the darkened state is advantageous since there is a larger concentration of mobile $Li^+$ in the electrode in the dark state than in the bleached state and therefore there is more charge readily available to be moved from the electrode into the redox element.

In some embodiments, the sequestration protocol described above can be performed to sequester charge from the electrochromic cathode, anode, or the cathode and anode. In some embodiments, the measurement of the OCV drift of the cathode or the anode can be performed in any device state, if the baseline state of the cathode or anode is well defined in that device state. An example of a device state where the cathode or the anode is well known is a darkened or intermediate device state where charge counting has occurred during switching so that the expected capacity of the cathode and/or anode is known.

In some embodiments, the sequestration method is done in multiple cycles. In one exemplary protocol, the sequestration is done in N cycles, where each cycle consists of a sequestration step and an equilibration step. In this example, after the device is darkened, Q/N charge is moved from the cathode into the redox element in a first sequestration step. In the first sequestration step, excess $Li^+$ in the cathode that is physically closest to the redox element is preferentially removed. In another embodiment, Qstep can be defined as the maximum amount of charge to be sequestered in a single step. In that case, after the device is darkened, Qstep charge is moved from the cathode into the redox element in each sequestration step. In some cases, the $Li^+$ that is closer in proximity to the redox element will be preferentially removed from the cathode, and cause an optical transmission gradient. In some cases, Qstep is defined as equal to or less than the maximum amount of charge that can be sequestered from the electrode (in a single step, i.e., without equilibration) without causing an optical transmission gradient that would be noticeable by an average user. One method of measuring a visually noticeable color change is delta E as defined below. The color of the window in the bleached or colored state can also be described by the L*a*b* color space. In this color space L* indicates the lightness with the darkest black at L*=0 and the brightest white at L*=100, a* indicates the red/green component of color with green at negative a* and red at positive a* values, and b* indicates the yellow/blue component of color with blue at negative b* and yellow at positive b* values.

Differences in color in the L*a*b* color space can be characterized by delta E (i.e., $\Delta E$), which is defined as:

In some cases, Qstep is defined as equal to or less than the maximum amount of charge that can be sequestered from the electrode (in a single step, i.e., without equilibration) without causing a delta E greater than a particular value, such as 0.25, 0.5, 0.75, 1, 1.25, 1.5, 1.75, or 2. After the charge is moved in a sequestration step, an equilibration step can be performed with all electrodes at OCV, which allows the device to equilibrate for some amount of time to allow the $Li^+$ in the cathode to redistribute. In some cases the concentration gradient of $Li^+$ in the cathode after the sequestration step drives the $Li^+$ concentration to become more uniform during the equilibration step due to diffusion. After the equilibration step, the next cycle will commence, where the next fraction of charge (e.g., Q/N, or Qstep) is removed from the cathode into the redox element in a next sequestration step. Performing sequestration in multiple cycles can be advantageous, because after each sequestration step there can be a concentration gradient in the cathode since the $Li^+$ is preferentially removed from locations closest to the redox element, and during each subsequent equilibration step the $Li^+$ redistributes to become more uniform. If too much charge is removed in a single step, then a large concentration gradient will result and cause a visible transmission gradient, which is unattractive to the user. Performing sequestration in multiple steps allows a large amount of charge to be sequestered without causing a noticeable optical transmission gradient after any sequestration step in the process. After N cycles are complete, Q charge (i.e., all or nearly all of the excess charge in the cathode) is removed, and the protocol is complete.

In some embodiments, if the OCV has drifted by more than a certain threshold, then an amount of charge Q that is necessary to return the cathode to a baseline state is calculated, and a single sequestration cycle containing a sequestration step followed by an equilibration step is performed. The baseline state is a state of desirable optical transmission and color, and a defined potential with respect to the reference electrode in the fully bleached state. In some embodiments, the sequestration step can move Q charge or some fraction of Q charge from the cathode into the redox element. After the single sequestration cycle, then the OCV drift can be measured again.

In other embodiments, if the OCV has drifted by more than a certain threshold, then an amount of charge Q that is necessary to return the cathode to a baseline state is calculated, and a number (N') of sequestration cycles, each containing a sequestration step followed by an equilibration step, is performed. In some embodiments, the sequestration step in each cycle can move Q/N' charge, or less than Q/N' charge, or more than Q/N' charge from the cathode into the redox element. After N' sequestration cycles, then the OCV drift can be measured again. In other words, in some cases, the OCV drift can be measured again before the full amount of Q charge is moved from the cathode to the redox element.

Figure 4:
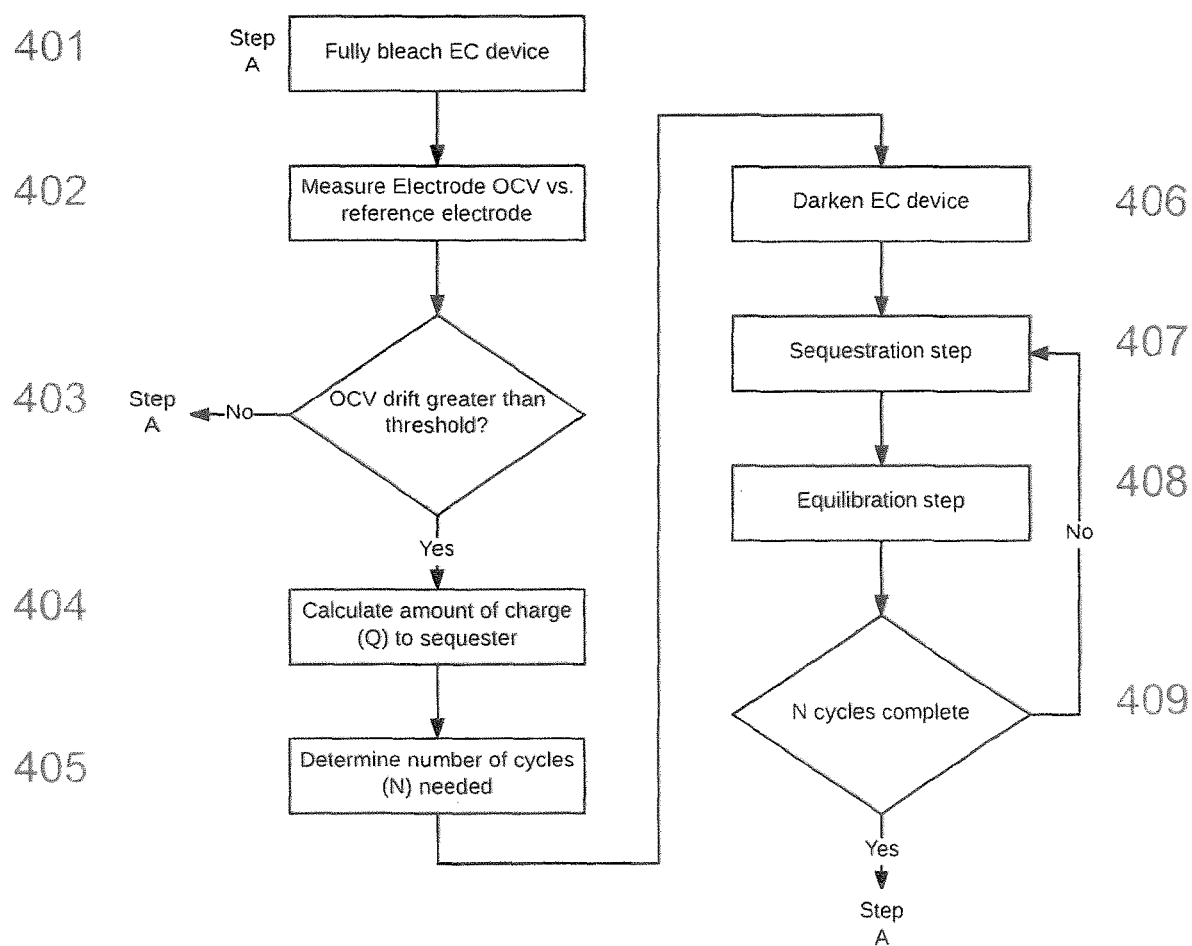
FIG. 4 is a flow diagram of a method for a sequestration protocol of an electrochromic device, which can be practiced using the systems of FIGS. 1 and 5 in some embodiments.

FIG. 4 illustrates some embodiments of electrochromic device sequestration protocols described herein. These are all embodiments, and should be understood to be illustrative as non-limiting possible embodiments. In this embodiment, the protocol begins by fully bleaching the EC device in action 401 (i.e., "Step A"), and measuring the OCV drift between the electrode (i.e., anode or cathode) and the reference electrode in action 402. If the OCV drift is less than a certain threshold in decision 403, then the protocol ends, and optionally starts again at action 401. If the OCV is greater than a certain threshold, then an amount of charge Q required to restore the electrode to a desirable state (e.g., a baseline state) is calculated in action 404. Next a number of cycles N is determined, based upon the charge Q and the desired amount of charge to be moved in each step in action 405. In some cases, the number of steps is determined by dividing the charge Q by an amount of charge Qstep, which is defined as the maximum amount of charge that can be sequestered from the electrode (in a single step, i.e., without equilibration) without causing an optical transmission gradient that would be noticeable by an average user. Then the process flow proceeds and the device is darkened in action 406, and then the sequestration step occurs in action 407, where charge is moved from the electrode to the redox element by applying a bias between the electrode and the redox element. Next, an equilibration step occurs in action 408, wherein the mobile charge (e.g., $Li^+$) is allowed to redistribute in the electrode. If N cycles has not been reached in decision 409, then the next sequestration cycle begins with another sequestration step in action 407. Once N cycles are complete in decision 409, then the protocol ends, and optionally begins again at action 401. In some embodiments, before 401 begins, or after the sequestration protocol ends and then begins again (i.e., the flow returns to "Step A" from action 403 or action 409), the electrochromic device can be switched between bleached and/or darkened states (e.g., in normal operation by a user).

In some embodiments, the sequestration steps will not begin unless the absolute value of the OCV between the EC electrode and the reference electrode is greater than a certain threshold. In some embodiments, the threshold is determined by the amount of OCV drift that will change the transmission, or color, of the electrode by a noticeable amount. In some embodiments, the OCV threshold is determined as the potential difference caused by the amount of charge added to or removed from the electrode that will induce a change in color, delta E equal to 0.25, 0.5, 0.75, 1, 1.25, 1.5, 1.75, or 2. Differences in color in the L*a*b* color space can be characterized by delta E (i.e., $\Delta E$), which is defined in equation 3 above. In other words, if the delta E of the electrode changes by more than a given amount (e.g., 1) then sequestration will be performed to move charge from the electrode to the redox element to restore the electrode back to a baseline color.

Figure 6C:
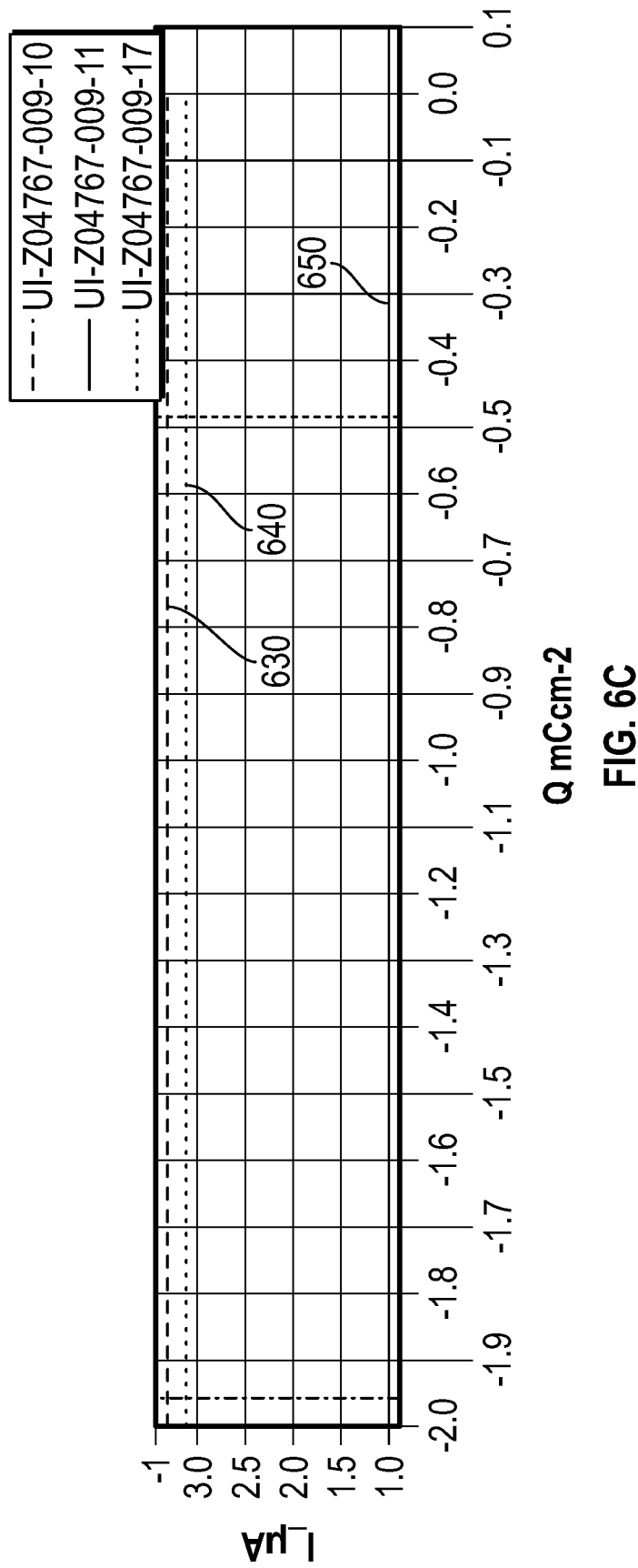
FIG. 6 are calibration curves for a $WO_3$ cathode.

In some embodiments, the amount of charge Q is calculated by referring to a calibration curve that relates a change in electrode potential to a change in the amount of charge added to or removed from the electrode. An example of a particular embodiment of calibration curve is illustrated in FIG. 6 and will described in more detail below in the Examples. For the calibration curves, the electrode material is characterized and a relationship is established between charge capacity of the electrode material (e.g., at the fully bleached state), the potential of the electrode with respect to the reference electrode, and the color of the electrode material. The baseline state of the electrode is also characterized, and thus a charge difference, a potential difference, and a color difference between a given state of the electrode and the baseline state of the electrode is established. These predetermined relationships can then be used in the sequestration protocol to determine how much charge is required to be sequestered, for a given OCV between the electrode and a reference electrode at the fully bleached state (or any well-defined, well characterized state), in order to return the electrode to the baseline state.

In some embodiments, the sequestration steps will not begin unless the device is sufficiently darkened (e.g., in step 406 in FIG. 4). In some embodiments, the device is darkened for more than 30 seconds, or more than 60 seconds, or more than 120 seconds, or more than 3 minutes, or more than 5 minutes, or more than 10 minutes, or more than 30 minutes, or from 30 seconds to 3 minutes, or from 30 seconds to 5 minutes, or from 30 seconds to 10 minutes before the sequestration steps (e.g., in steps 407, 408 and 409 in FIG. 4) begin.

In some embodiments, the sequestration is done in multiple cycles, and the amount of charge moved between the electrode and the reference electrode in each sequestration step of each cycle is below a value q*. In some embodiments, charge is preferentially sequestered from an electrode into a redox element from locations in the electrode nearest the redox element, which causes a different transmission of the electrode near the redox element compared to locations farther away from the redox element. In some embodiments, the amount of charge q* is the amount of charge that can be removed from an electrode in an EC device such that if there device were bleached directly after the sequestration step (e.g., 407 in FIG. 4) that no discernable transmission gradient would be noticeable by an average human observer.

One advantage of performing many small sequestration cycles, is that any transmission gradient produced in the device due to the sequestration of charge nearest the redox element will be small. In some embodiments, the number of cycles is sufficiently large, so that if a panel is bleached immediately following a sequestration step (i.e., before equilibration can occur), then there would be no perceptible transmission differences across the area of the device (to an average user).

In some embodiments, the number of sequestration cycles N (e.g., in action 405 in FIG. 4) is from 1 to 1000, or from 1 to 500, or from 1 to 100, or from 1 to 50, or from 1 to 20, or from 1 to 10, or from 1 to 5.

In some embodiments, the number of cycles N (e.g. in action 405 in FIG. 4) is calculated by dividing Q by q* and rounding up to the nearest integer. In some embodiments, N is calculated by dividing Q by q*, multiplying by some factor (e.g., 1.05, 1.1, or 1.2, or 1.3, or 1.5, or 2) as a safety margin, and rounding up to the nearest integer. In some cases, the number of cycles N (e.g. in action 405 in FIG. 4) is calculated by dividing Q by q* and (rather than rounding) the last step will move an amount of charge that is smaller than the amount of charge used in each previous step so that a total of Q charge is moved after all N steps are complete.

In some embodiments (e.g., those described in FIG. 4), the number of sequestration cycles N is 1. In this case, the EC device is fully bleached in action 401 and the OCV is measured in action 402 to determine if the OCV has drifted beyond a certain threshold. If the OCV has drifted beyond the threshold, then the EC device is darkened in action 406, one sequestration cycle is performed in actions 407 and 408, then the sequestration protocol ends, and optionally the EC device is bleached and the OCV is measured again. As in other embodiments, after action 409 the device can be switched between bleached and darkened states (e.g., in normal use) before the protocol is started again at action 401. The amount of charge that is moved in the sequestration step can be the full value of Q, or it can be smaller than Q, or it can be q* (as defined above), or it can be some value smaller than q*.

In some embodiments, the duration of the sequestration step is relatively short compared to the equilibration step. In some embodiments, the duration of the sequestration step in each cycle is from 10 seconds to 10 minutes, or from 10 seconds to 5 minutes, or from 10 seconds to 1 minute, and the duration of the equilibration step in each cycle is from 0.1 to 10 hours, or from 0.5 to 10 hours, or from 1 to 10 hours, or from 1 to 5 hours. The durations of each step could change with the size of the device. In some embodiments, the device area is approximately 1 m$^2$, and the duration of the sequestration step in each cycle is from 10 seconds to 10 minutes, or from 10 seconds to 5 minutes, or from 10 seconds to 1 minute, and the duration of the equilibration step in each cycle is from 0.1 to 72 hours, or from 1 to 72 hours, or from 10 to 72 hours, or from 1 to 48 hours, or from 10 to 48 hours, or from 1 to 24 hours, or from 10 to 24 hours, or from 0.1 to 10 hours, or from 0.5 to 10 hours, or from 1 to 10 hours, or from 1 to 5 hours, or greater than 10 hours, or greater than 24 hours, or greater than 48 hours, or greater than 1 week. In some embodiments, the duration of the sequestration step and/or the equilibration step will scale linearly with the area of the device. In some cases, for larger devices, then the sequestration step will be longer than 10 minutes, or longer than 30 minutes, and the equilibration step will be longer than 24 hours, or longer than 1 week.

The length of time of the sequestration step and the equilibration step depends on many factors, including but not limited to, the time between sequestration cycles, the rate of spurious oxidation and/or reduction, the size of the redox element and the materials comprising the ion conductor and the redox element.

In some embodiments, the reduction or oxidation of the electrochromic electrodes via the redox element, resulting from an applied potential outside of the normal operating voltage range of the device, changes the optical transmission at 550 nm (or Tvis) by more than 0.1%, or more than 0.5%, or more than 1%, or more than 2%, or more than 4%, or more than 6%, or more than 10%, or more than 20%, or more than 30%, or more than 40%, or more than 50%, or more than 60%, or more than 70%, or more than 80% in a total integrated sequestration time (i.e., a sum of the duration of all of the sequestration steps) of less than 24 hours, or less than 12 hours, or less than 6 hours, or less than 2 hours, or less than 1 hour, or less than 30 minutes, or less than 15 minutes, or less than 10 minutes, or less than 5 minutes, or less than 2 minutes.

In some embodiments, the charge is sequestered from the electrode to the redox element by applying a constant current between the bus bar that is electrically connected to the electrically conductive layer that is electrically connected to the electrode. In some embodiments, the rate at which charge is sequestered from the electrode to the redox element is less than 10 A, or less than 5 A, or less than 2 A, or less than 1 A, or less than 500 mA, or less than 200 mA, or less than 100 mA, or from 10 mA to 10 A, or from 10 mA to 5 A, or from 10 mA to 2 A, or from 10 mA to 1 A, or from 100 mA to 1 A, or from 100 mA to 500 mA.

The sequestration protocols described herein can occur periodically to correct for undesired faradaic losses in the electrochromic device. In different cases, the length of time between sequestration protocols is from 1 day to 1 month, or from 1 day to 7 days, or from 1 week to 1 month, or from 1 day to 3 months, or from 1 day to 6 months. The length of time between sequestration protocols may vary depending on the size, design, number of redox elements, chemistry of the device, materials comprising the multi-layer stack (e.g. anode, cathode, ion conductor), materials comprising the redox element, the thickness and/or volume of the ion conductor, the ion conductivity of the ion conductor, the ion diffusivity of the ion conductor, and the environmental conditions (e.g. the temperature of the device).

The length of time between sequestration protocols can also be related to the spurious charge built up in the anode, or cathode, or both. In this case, the charge on the electrode can be monitored by the control circuitry and the sequestration protocol started when a certain charge condition is reached on the multi-layer stack, or the anode, or the cathode, or both, for a given condition (e.g., fully bleached, or darkened, or partially darkened) of the multi-layer stack. In some cases, the sequestration protocol can be initiated based upon the open circuit voltage between the electrically conductive layers, measured when the device is in a particular state.

In other cases, the length of time between sequestration protocols can be related to the number of switching cycles of the multi-layer stack between more transmissive and less transmissive states. In this case, the sequestration protocol would be triggered to begin after a certain number of switching cycles. The number of switching cycles triggering the sequestration protocol can be 0.5, 1, 2, 3, 4, 5, 6, 7, 8, 9, 10, from 0.5 to 10, from 1 to 10, from 10 to 100, from 5 to 20, or from 0.5 to 100, or less than 10, or less than 5, or less than 2.

In some cases, during the sequestration, when current and/or voltage is applied to the auxiliary electrode of the redox element, the state of the multi-layer stack is in the open circuit in the bleached (more transmissive) state, or in the fully bleached state, or in a state that is not a fully bleached state, or in a darkened state. In some instances it is advantageous to sequester charge when the device is in the bleached state because in the fully bleached state there is excess charge in the cathode only. In the fully bleached state, excess charge is only in the cathode and sequestration can proceed until the current goes to zero and the excess charge present in the cathode is completely moved to the auxiliary electrode. In that case the amount of excess charge sequestered does not need to be quantified. In other states, however, the charge in the anode/cathode will be a mix of excess charge and charge initially present in the device, and sequestering in those states may require carefully counting charge to know exactly how much excess charge is being sequestered. In these states the sequestration would be performed to a specific charge limit.

In some cases, the measurement of the OCV between the electrode and the reference electrode will not begin until the device is in a sufficiently bleached state. In some cases, the device could be monitored to ensure that the device is in a sufficiently bleached state before the OCV measurement is performed (e.g., action 402 in FIG. 4). This could be accomplished by waiting some amount of time after the device is switched into the bleached state before the OCV measurement is performed. In some embodiments this delay time could be from 1 minute to 12 hours, or from 10 minutes to 1 hour, or from 10 minutes to 5 hours, or from 5 to 12 hours, or greater than 1 minute, or greater than 5 minutes, or greater than 10 minutes, or greater than 20 minutes, or greater than 40 minutes, or greater than 1 hour, or greater than 2 hours, or greater than 3 hours, or greater than 4 hours. The delay time may be different depending on the device size, design, number of redox elements, chemistry of the device, materials comprising the multi-layer stack (e.g. anode, cathode, ion conductor) materials comprising the redox element, the thickness and/or volume of the ion conductor, the ion conductivity of the ion conductor, the ion diffusivity of the ion conductor, and the environmental conditions (e.g. the temperature of the device). There may also be other methods to ensure that the multi-layer stack is in a sufficiently bleached state, such as sensing the potentials, currents or charge on different electrodes, using active feedback, and/or using preset applied bias, applied current or injected charge algorithms.

In some cases, the sequestration step (e.g., action 407 in FIG. 4) will not begin until the multi-layer stack is in a sufficiently darkened state. In some cases, the device could be monitored to ensure that the device is in a sufficiently darkened state before sequestration. This could be accomplished by waiting some amount of time after the device is switched into the darkened state before the sequestration step is begun. In some embodiments this delay time could be from 1 minute to 12 hours, or from 10 minutes to 1 hour, or from 10 minutes to 5 hours, or from 5 to 12 hours, or greater than 1 minute, or greater than 5 minutes, or greater than 10 minutes, or greater than 20 minutes, or greater than 40 minutes, or greater than 1 hour, or greater than 2 hours, or greater than 3 hours, or greater than 4 hours. The delay time may be different depending on the device size, design, number of redox elements, chemistry of the device, materials comprising the multi-layer stack (e.g. anode, cathode, ion conductor) materials comprising the redox element, the thickness and/or volume of the ion conductor, the ion conductivity of the ion conductor, the ion diffusivity of the ion conductor, and the environmental conditions (e.g. the temperature of the device). There may also be other methods to ensure that the multi-layer stack is in a sufficiently darkened state, such as sensing the potentials, currents or charge on different electrodes, using active feedback, and/or using preset applied bias, applied current or injected charge algorithms.

In some cases, the sequestration protocol would begin only when the incident solar radiation is below some threshold. The incident solar radiation could be directly measured, or could be approximated by a certain range of times of day at certain times of the year in a certain known location. In some cases, the sequestration protocol would begin only when the light incident on the device is below some threshold.

In some cases, multiple conditions would have to be met for the sequestration protocol to begin. These multiple conditions could be the combination of the device being in a particular state (e.g., fully bleached, darkened, or partially darkened), and when the incident light (e.g., solar radiation) is below some threshold.

It may be desirable to maintain a low potential within the device during the sequestration step (e.g., action 407 in FIG. 4). In some cases low potential during the sequestration step may mitigate damage to the device caused by sequestration (e.g., in the dark, or in the presence of incident radiation). This could be accomplished by applying a constant current during the sequestration step, with a potential limit programmed between some or all of the device electrodes, including, for example, between the auxiliary electrode of the redox element and the electrically conductive layers, and between the first and second electrically conductive layers.

Figure 5:
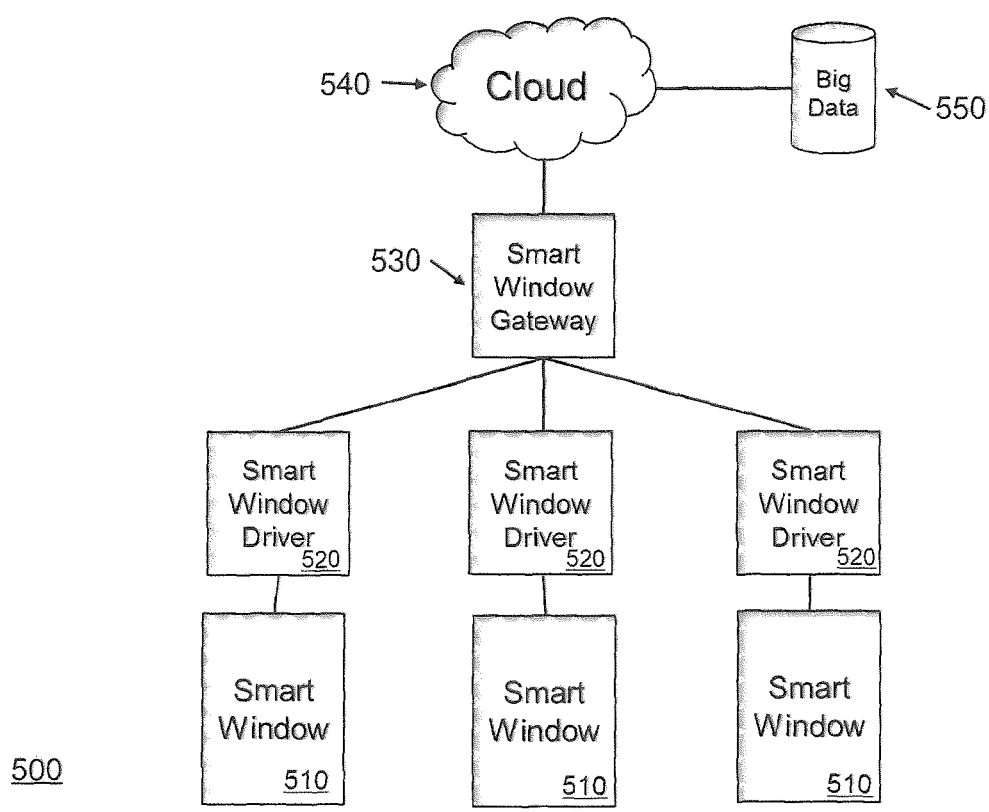
FIG. 5 is an embodiment of a smart window system.

The charge sequestration method may be performed on electrochromic windows within a smart window system such as the one shown in FIG. 5. The smart window system 500 disclosed herein, may have a distributed device network control system architecture that can distribute control of optical transmissivity of smart windows 520 across the smart windows 520, smart window drivers 520, a smart window gateway 530, and one or more resources on a cloud network 540. A smart window within such a system can be defined as a window with some local and/or external or remote computer processing capabilities and which is connectable to the internet. In some embodiments the window is an electrochromic window but this is not meant to be limiting as non-electrochromic windows may be smart windows as described herein. Electrochromic and non-electrochromic windows may be integrated into the same system in some embodiments. The smart window may function as a glass partition in some embodiments and be within an interior of a structure rather than have one surface facing an exterior in some embodiments.

Figure 10:
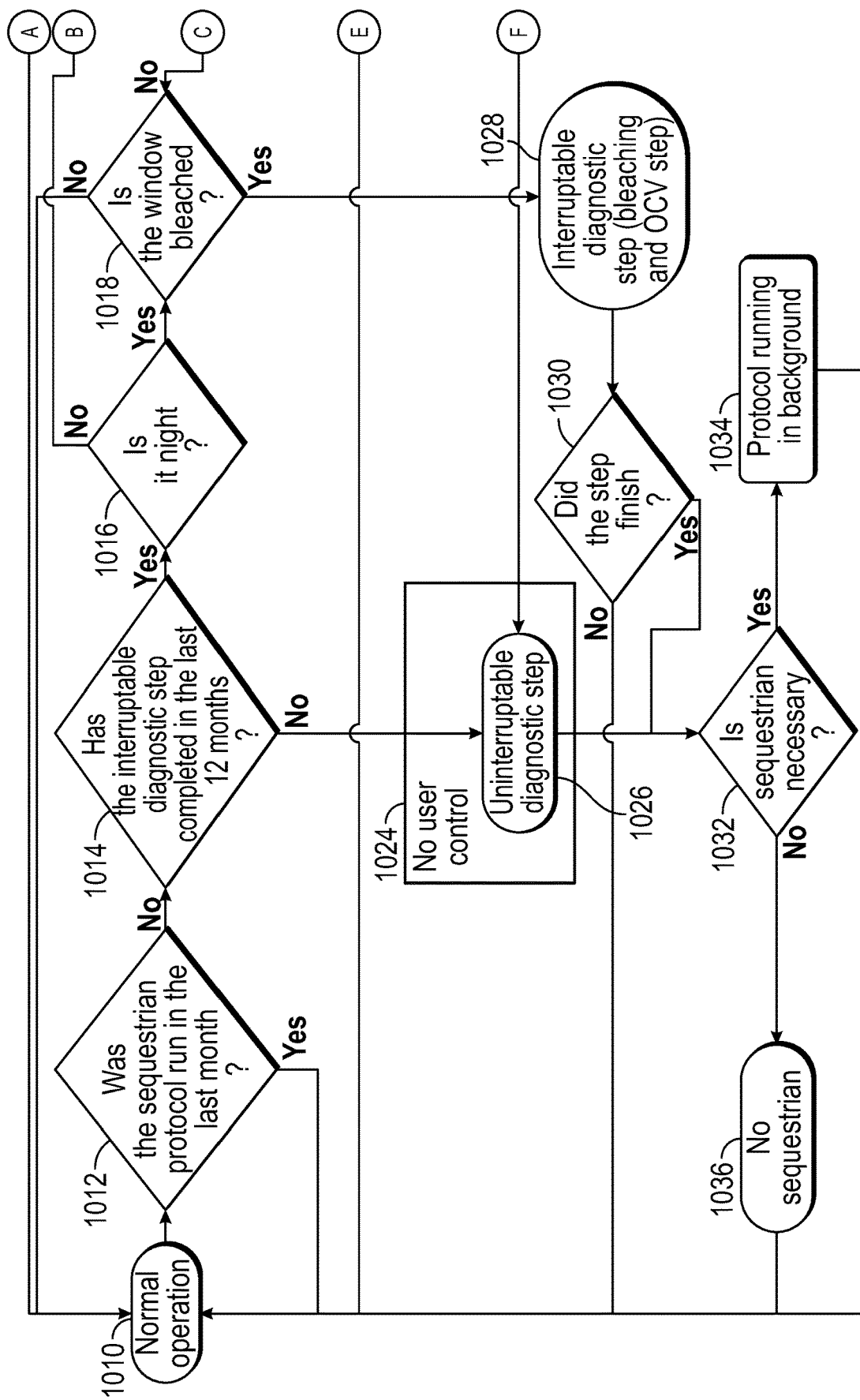
FIGS. 10 and 11 are flow diagrams of methods for sequestration protocols for electrochromic devices, which can be practiced using the systems of FIGS. 1 and 5 in some embodiments.
Figure 10:
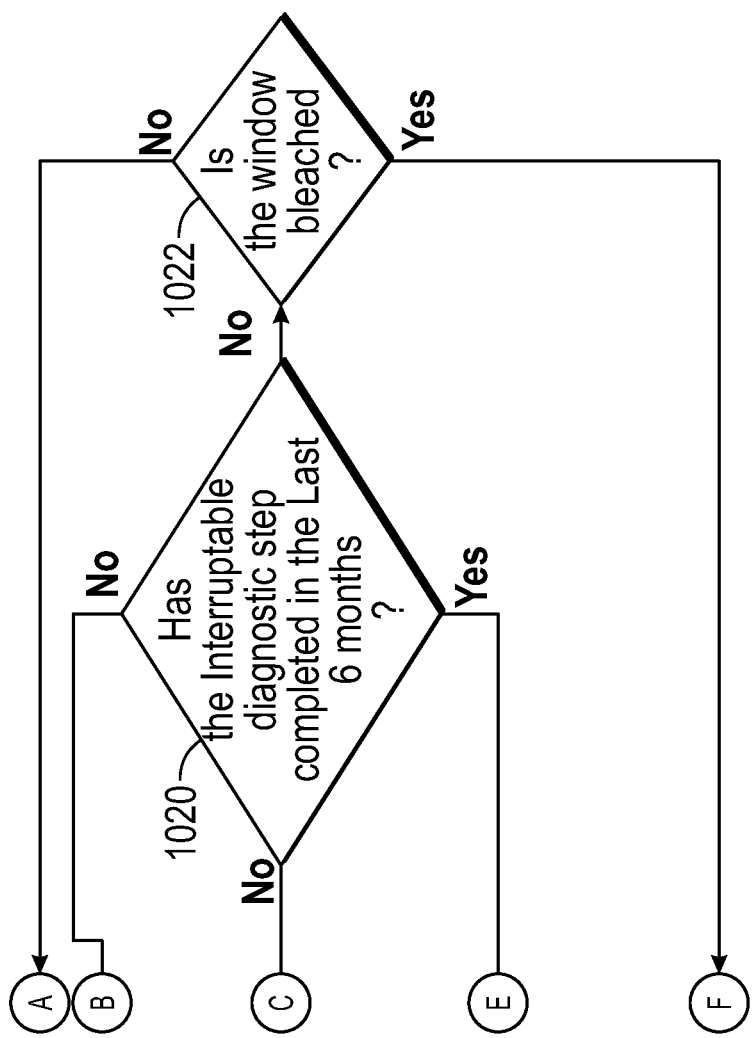
Figure 11:
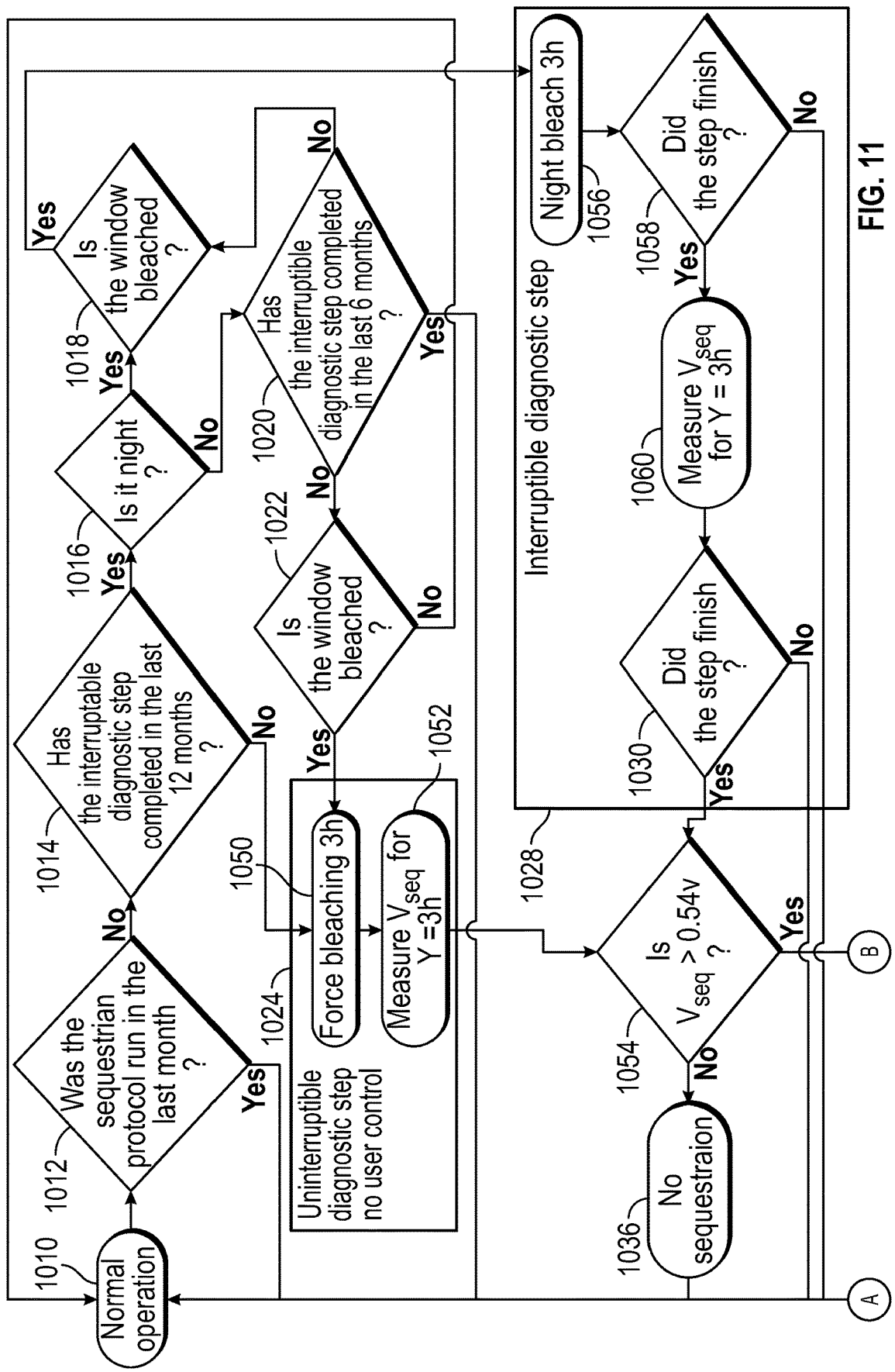
Figure 11:
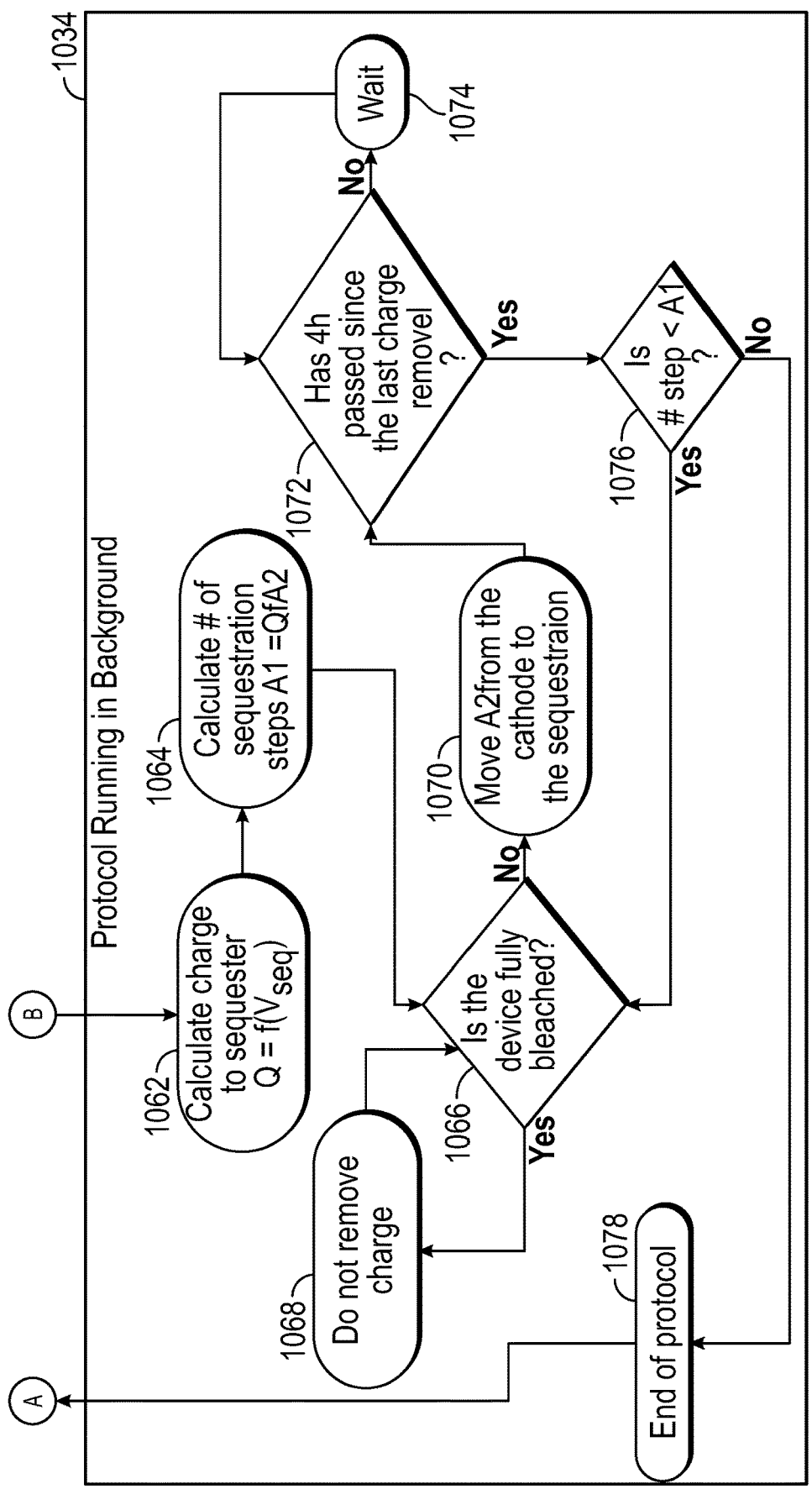

In one embodiment the charge sequestration method as described in various embodiments of this invention, including the flow charts of FIGS. 4, 10, and 11 may be stored in the cloud network 540 and shared with the smart window drivers 520 through the smart window gateway 530. The smart window system 500 may include any number of smart windows 510 and their associated drivers 520. In alternate embodiments more than one smart window 510 may be associated with a single driver. Also, the smart window 510 may have more than one electrochromic device incorporated. For example a smart window 510 may have more than one electrochromic device layered over one another or in separate regions of the window. In another embodiment, the instructions for the charge sequestration method may be stored on a processor in either the smart window drivers 520 or on the smart window gateway 530. In these embodiments, the charge sequestration method may be updated with additional instructions or changes from the cloud network 540. These updates may be determined based on optimizations of the method calculated using data collected on the smart window system 500 over time or from other similar smart window systems that may come from a big data 550 storage.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1

EC Device WO$_3$ Cathode Calibration

As described herein, an amount of charge Q can be transferred from the redox element to the cathode electrochromic layer to account for faradaic losses that occur over time. The amount of charge Q needed to be transferred can be determined by measuring the potential of the cathode (e.g., versus a reference electrode) and then relating the measured potential to the amount of charge Q. The amount of charge Q can be calculated by referring to a calibration curve that relates a change in electrode potential to a change in the amount of charge added to or removed from the electrode. This Example illustrates the calibration of a cathodic electrochromic layer to establish a relationship between charge capacity of the electrode material (e.g., at the fully bleached state), the potential of the electrode with respect to the reference electrode, and the color of the electrode material. In this Example, the baseline state of the cathode was characterized, and a charge difference, a potential difference, and a color difference between a range of cathode potentials and the baseline state of the cathode was established.

The relationships established in this Example were then used in Example 2 to determine how much charge was required to be sequestered in order to return the electrode to the baseline state.

FIG. 6 shows calibration curves for three different WO$_3$ cathodes. The x-axis for the calibration curves is a capacity difference from a baseline state (that is also a fully bleached state) to a changed state, in units of mC/cm$^2$. For example, −0.5 mC/cm2 on the x-axis depicts the charge in a cathode with additional intercalated Li$^+$ that changed the capacity of the cathode by 0.5 mC/cm$^2$ compared to the baseline state. These calibration curves were generated by applying a constant current of approximately 1 µA or 3 µA to the cathode to add intercalated Li$^+$ to the cathode (as shown in curves 630, 640 and 650 in FIG. 6), and the resulting potential with respect to Li$^+$/Li and delta E (as defined above) were measured.

Curve 610 in FIG. 6 shows the potential (in volts) of the WO$_3$ cathode with respect to Li$^+$/Li, as the capacity is changed through the intercalation of additional Li$^+$. For example the baseline state potential of the WO$_3$ cathode has a potential of approximately 3.4 V with respect to Li$^+$/Li. The potential of the WO$_3$ cathode with additional intercalated Li$^+$ and a capacity that is changed by approximately 0.5 mC/cm$^2$, is approximately 3.0 V with respect to Li$^+$/Li.

Curve 620 in FIG. 6 shows the delta E of the WO$_3$ cathode as the capacity is changed through the intercalation of additional Li$^+$. Since the delta E is a color difference between a changed state and the baseline state, the baseline state has a delta E equal to zero. The delta E of the WO$_3$ cathode with additional intercalated Li$^+$ and a capacity that is changed by approximately 0.5 mC/cm$^2$ compared to the baseline state is approximately 0.7.

In this example, the delta E of the WO$_3$ cathode reaches a value of 1 (compared to the baseline state) with additional intercalated Li$^+$ and a capacity that is changed by approximately 0.7 mC/cm$^2$ compared to the baseline state. The calibration curves also show that with additional intercalated Li$^+$ and a capacity that is changed by approximately 0.7 mC/cm$^2$ the potential of the cathode with respect to Li+/Li is approximately 2.95 V.

In the sequestration protocol described herein the cathode potential could be measured with respect to the reference electrode, which is well defined with respect to Li$^+$/Li. For example, lithium iron phosphate (Li$_{1-x}$FePO$_4$) has a potential with respect to Li+/Li equal to approximately 3.4 V, and does not appreciably change with the addition or removal of Li$^+$. In a device, the WO$_3$ cathode in this example would therefore have a potential with respect to lithium iron phosphate of approximately 0 V at the baseline state. If the WO$_3$ cathode potential drifted (e.g., due to spurious oxidation), such that the capacity was changed by 0.7 mC/cm$^2$, then the calibration curves illustrate that the OCV between the WO$_3$ cathode and the lithium iron phosphate reference electrode would have an absolute value of approximately −0.4 V. The calibration curves also indicate that the delta E of the cathode in this case would be approximately 1 (compared to the baseline state). Since a delta E greater than 1 is observable to an average observer, in some cases, an absolute value of OCV greater than or equal to approximately 0.4 V would trigger the sequestration steps to commence.

Example 2

EC Device with Redox Element and Reference Electrode

The devices in this example have an area of approximately 232 cm$^2$, with a WO$_3$ cathode, an IC, and a LiNO anode. The devices have a redox element containing an auxiliary electrode, that is formed from an electrically isolated ITO region, and a sequestration material that is lithium iron phosphate ($Li_{1-x}FePO_4$). The redox element containing the lithium iron phosphate also serves as a reference electrode in this device.

Figure 7A:
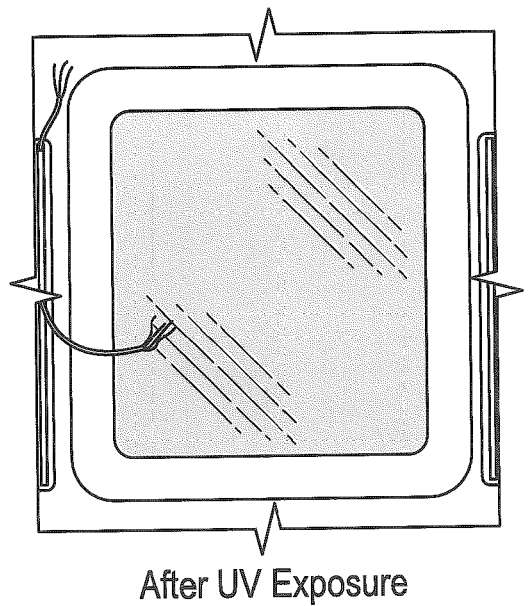
FIGS. 7A and 7B are images of EC devices containing a redox element and reference electrode before and after a sequestration protocol.

Initially, the device is exposed to UV light (wavelength equal to 405 nm), and the initial state of the device after exposure to UV light is shown in FIG. 7A. FIG. 7A shows that the device became darker due to the UV light exposure. After exposure to UV light, the sequestration protocol began and the cathode OCV was measured with respect to the reference electrode. In the initial state, the OCV had drifted by approximately −0.587 V (i.e., after UV exposure the cathode had a potential of 2.813 V with respect to $Li^+/Li$), and the transmission and the color of the device was changed from the baseline state. According to the calibration curves in Example 1 (FIG. 6), an OCV drift of −0.587 V corresponds to a change in capacity of 1.96 mC/cm2 compared to baseline. Additionally, the calibration curves from Example 1 indicate that the delta E of the cathode with an OCV drift of −0.587 V is greater than 1, which is consistent with the device appearance in FIG. 7A. In order to sequester charge and return the cathode to a state where the potential is equal to 3.0 V with respect to $Li^+/Li$, approximately 220 mC is required to be sequestered from the cathode into the redox element. The target value of 3.0 V was determined from the calibration curves. The calibration curves from Example 1 (FIG. 6) show that if the cathode were in a state where the potential was equal to 3.0 V with respect to $Li^+/Li$, then it would be in a state with a delta E less than 1 compared to baseline.

Figure 7B:
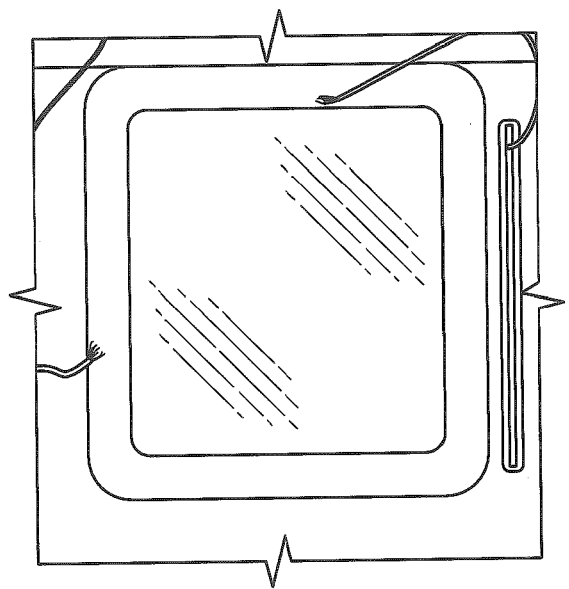

The sequestration method continued by determining that the number of sequestration cycles to be performed was 53, and approximately 4.14 mC/cycle would be sequestered from the cathode into the redox element. Then the device was darkened by applying a potential between the EC device anode and the cathode to switch the device into a darkened state. Then 53 sequestration cycles were performed, where each cycle consisted of a sequestration step where a constant current of 0.18 mA was applied for 23 seconds, and an equilibration step where the device was held at open circuit for 1 hour. After 53 sequestration cycles were complete, the device delta E was reduced as shown in FIG. 7B. FIG. 7B shows that the device was a lighter color, and had a higher transparency, after the sequestration protocol was performed.

Example 3

EC Device with Redox Element and Reference Electrode

Figure 8:
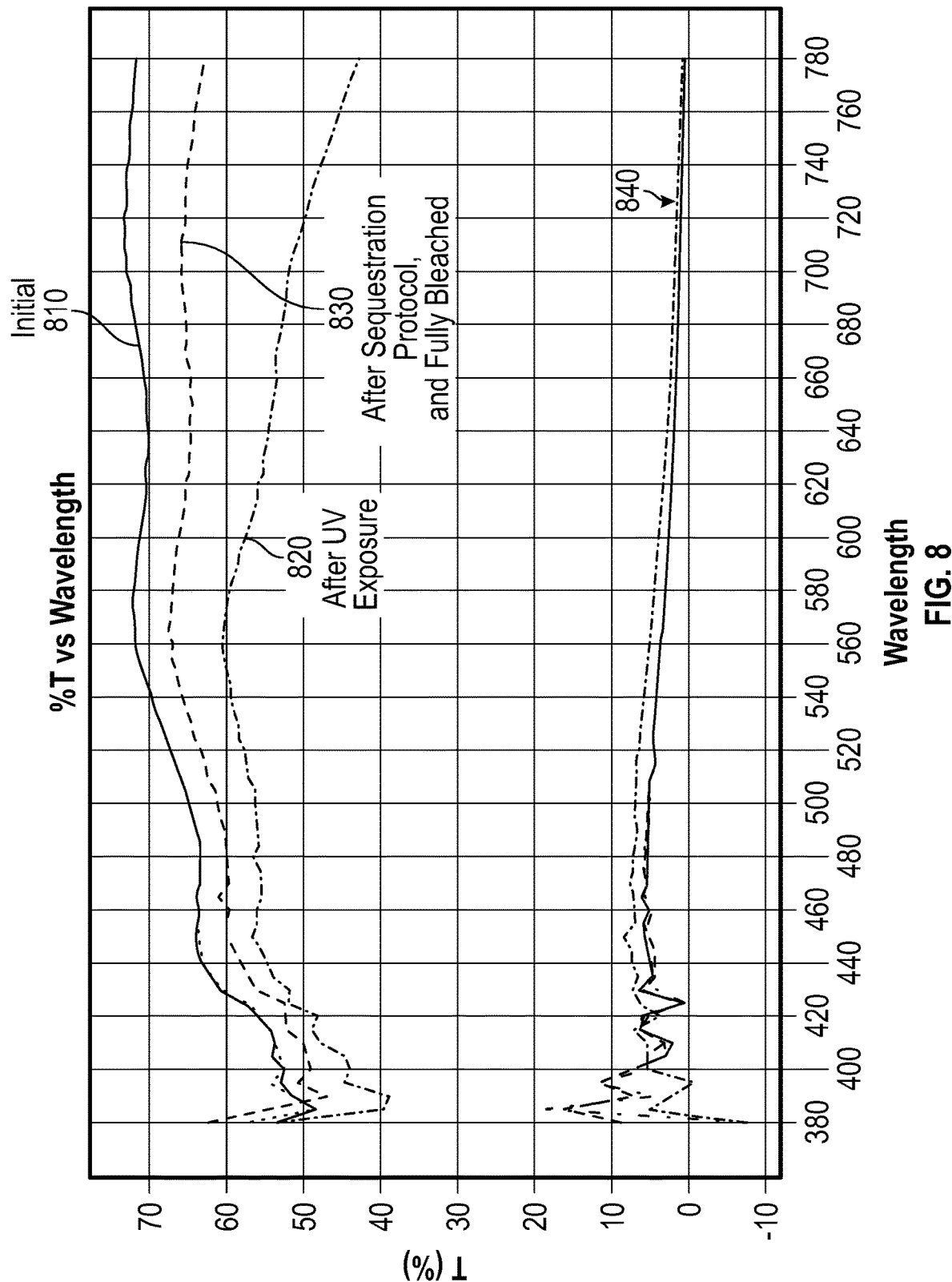
FIG. 8 shows transmission spectra of an EC device containing a redox element and reference electrode before and after a sequestration protocol.

FIG. 8 shows transmission spectra from the same types of devices as described in Example 2, which went through a similar sequestration protocol as described in Example 2. There are three transmission spectra in the bleached states and corresponding transmission spectra in the darkened states. Curve 810 shows the transmission of the device in an initial state. Curve 820 shows the transmission of the device in a state after excess charge has been generated due to UV exposure. Curve 830 shows the transmission of the device after a sequestration protocol has been performed to remove the excess charge generated due to the UV exposure and the device was subsequently fully bleached. The dark state transmission spectra did not change significantly between the three states and are shown in curves 840. The highest bleached state transmission was that of the initial state (i.e., directly after device fabrication), with a T550 (i.e., transmission at 550 nm) of about 70%. After UV exposure, the transmission of the device decreased significantly, and T550 dropped to about 60%. After the sequestration protocol, and after being fully bleached, the transmission increased back up to about 67%, close to the initial state of the newly fabricated electrochromic device.

Example 4

EC Device $WO_3$ Cathode Calibration

For similar reasons outlined in Example 1, this Example illustrates the calibration of a cathodic electrochromic layer to establish a relationship between charge capacity of the electrode material (e.g., at the fully bleached state), the potential of the electrode with respect to the reference electrode, and the color of the electrode material. In this Example, the baseline state of the cathode was characterized, and a charge difference, a potential difference, and a color difference between a range of cathode potentials and the baseline state of the cathode was established.

Figure 9A:
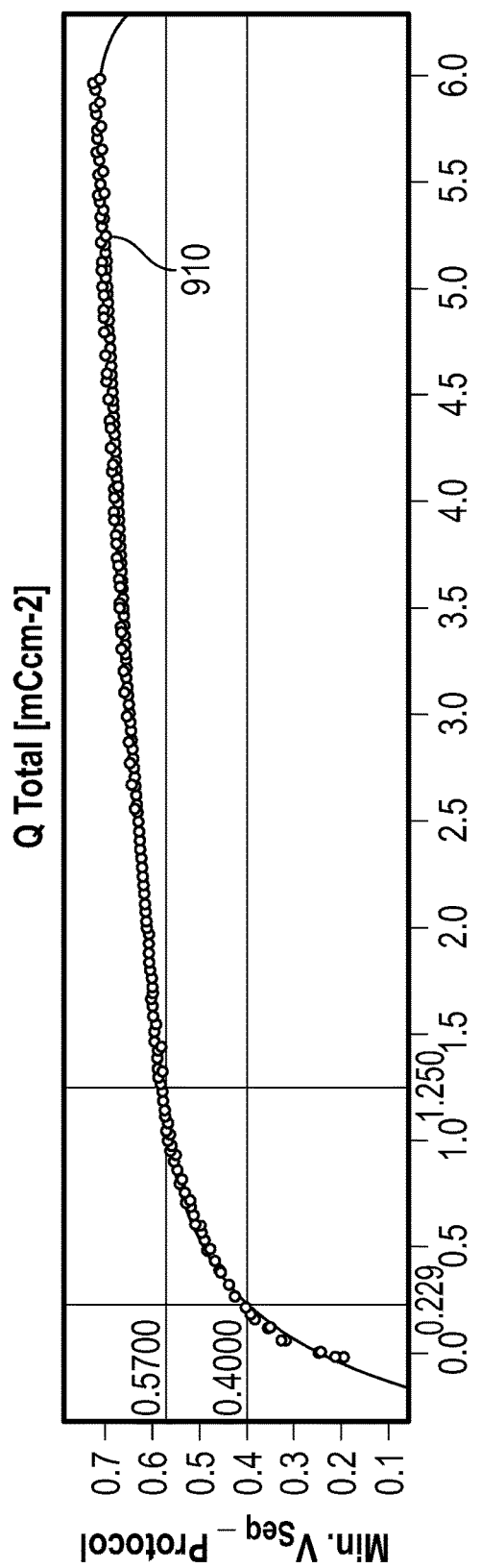
FIG. 9 shows calibration curves for a $WO_3$ cathode.
Figure 9B:
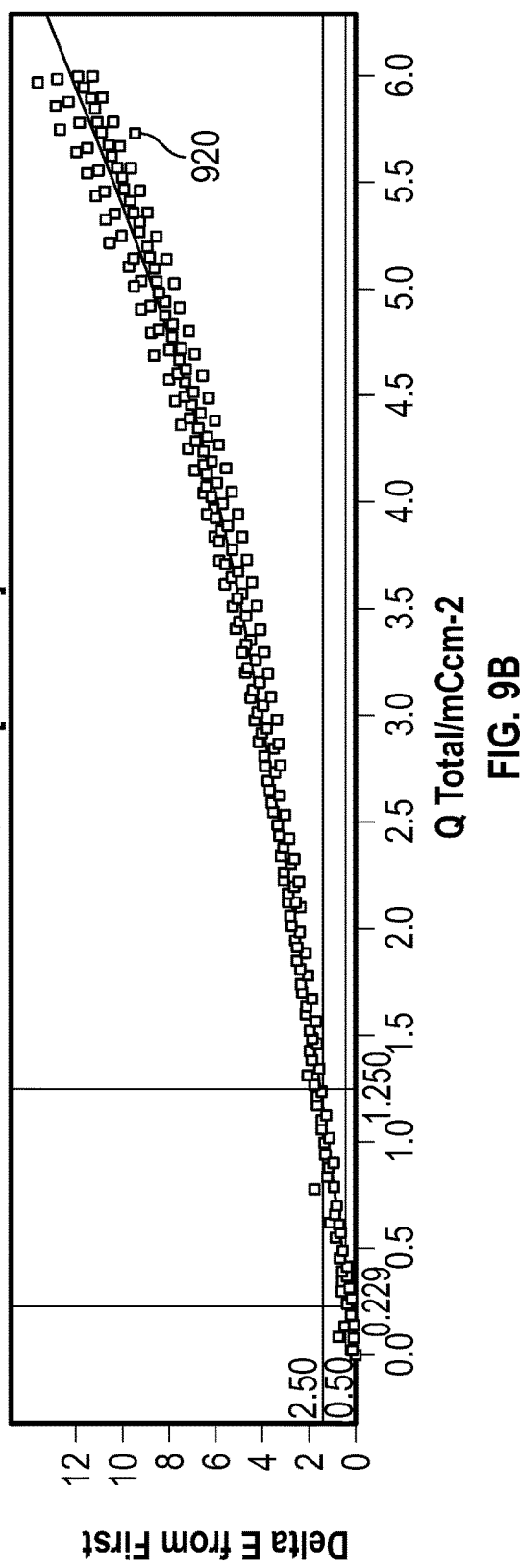

FIG. 9 shows calibration curves for four different $WO_3$ cathodes. The devices in this Example were similar to the devices characterized in Example 1, but were produced from different batches of materials. The x-axis for the calibration curves in FIG. 9 is a capacity difference from a baseline state (that is also a fully bleached state) to a changed state, in units of $mC/cm^2$. The y-axis in the upper graph in FIG. 9 shows the potential difference between the cathode and the reference electrode at the changed state. In other words, Vseq equals the potential of the reference electrode minus the potential of the cathode. The y-axis in the lower graph in FIG. 9 shows the delta E (as defined above) between the cathode in the changed state compared to the baseline state. Note that the charge capacity and device potentials are defined slightly differently than they are in Example 1. In this Example, +0.5 $mC/cm^2$ on the x-axis depicts the charge in a cathode with additional intercalated $Li^+$ that changed the capacity of the cathode by 0.5 $mC/cm^2$ compared to the baseline state (i.e., which is the negative of the convention used in Example 1). The calibration curves in FIG. 9 were generated by applying a constant current of approximately 0.3 $\mu A/cm^2$ or 1 $\mu A/cm^2$ to the cathode to add intercalated $Li^+$ to the cathode, and the resulting potential with respect to $Li^+/Li$ and delta E (as defined above) were measured.

The curve 910 in the upper graph in FIG. 9 shows the potential difference (in volts) of the $WO_3$ cathode with respect to the reference electrode, as the capacity is changed through the intercalation of additional $Li^+$. For example the baseline state potential of the $WO_3$ cathode has a potential of approximately 0.0 V with respect to the reference electrode. The data is only plotted down to approximately 0.2 V due to large uncertainties in the measurement as the potential gets close to 0 V. This is due to the fact that in this Example, the reference electrode was lithium iron phosphate ($Li_{1-x}FePO_4$), which has a potential with respect to $Li+/Li$ equal to approximately 3.4 V, and the $WO_3$ cathode also has a potential with respect to $Li+/Li$ of approximately 3.4 V in the baseline state. As additional intercalated $Li^+$ is incorporated into the $WO_3$ cathode, the potential of the cathode with respect to the reference electrode changes. For example, as the capacity of the $WO_3$ cathode with additional intercalated $Li^+$ is changed by approximately 0.229 $mC/cm^2$, the potential changes by approximately 0.40 V with respect to the reference electrode. For example, as the capacity of the $WO_3$ cathode with additional intercalated $Li^+$ is changed by approximately 1.229 mC/cm², the potential changes by approximately 0.57 V with respect to the reference electrode.

The curve 920 in the lower graph in FIG. 9 shows the delta E of the $WO_3$ cathode as the capacity is changed through the intercalation of additional $Li^+$. Since the delta E is a color difference between a changed state and the baseline state, the baseline state has a delta E equal to zero. As the capacity of the $WO_3$ cathode with additional intercalated $Li^+$ is changed by approximately 0.229 mC/cm² compared to the baseline state, the delta E changes by approximately 0.5. As the capacity of the $WO_3$ cathode with additional intercalated $Li^+$ is changed by approximately 1.229 mC/cm² compared to the baseline state, the delta E changes by approximately 1.5.

In this example, the delta E of the $WO_3$ cathode reaches a value of 1 (compared to the baseline state) with additional intercalated $Li^+$ and a capacity that is changed by approximately 0.8 mC/cm² compared to the baseline state.

In the sequestration method described herein the cathode potential could be measured with respect to the reference electrode, which is well defined with respect to $Li^+/Li$. For example, lithium iron phosphate ($Li_{1-x}FePO_4$) has a potential with respect to Li+/Li equal to approximately 3.4 V, and does not appreciably change with the addition or removal of $Li^+$. In a device, the $WO_3$ cathode in this example would therefore have a potential with respect to lithium iron phosphate of approximately 0 V at the baseline state. If the $WO_3$ cathode potential drifted (e.g., due to spurious oxidation), such that the capacity was changed by 0.7 mC/cm², then the calibration curves illustrate that the OCV between the $WO_3$ cathode and the lithium iron phosphate reference electrode would have an absolute value of approximately −0.4 V. The calibration curves also indicate that the delta E of the cathode in this case would be approximately 1 (compared to the baseline state). Since a delta E greater than 1 is observable to an average observer, in some cases, an absolute value of OCV greater than or equal to approximately 0.4 V would trigger the sequestration steps to commence.

Example 5

EC Device Charge Sequestration Methods

FIGS. 10 and 11 illustrate flowcharts of non-limiting example embodiments of charge sequestration methods for controlling electrochromic windows, including sequestration. The methods illustrated in FIGS. 10 and 11, begin at action 1010, described as "normal operation". Normal operation can be any method for controlling electrochromic windows, including but not limited to bleaching and darkening the devices based on user input, predetermined schedules, and/or automatically based on control algorithms (e.g., with sensor input, or input from a building management system). Some examples of normal operation for electrochromic windows and devices are the control schemes described in US 2016/0202590, which is incorporated herein by reference.

If the sequestration protocol was run in the last month in decision 1012, then the normal operation is continued in action 1010. If the sequestration protocol was not run in the last month in decision 1012, then the flow continues to decision action 2014.

If the interruptible diagnostic step has been run in the last 12 months, then flow continues to decision action 1016. If the interruptible diagnostic step has not been run in the last 12 months, then the uninterruptible diagnostic step is performed in action 1026. During the uninterruptible diagnostic step, the user is locked out and there is no user control (as shown in box 1024).

Figure 12:
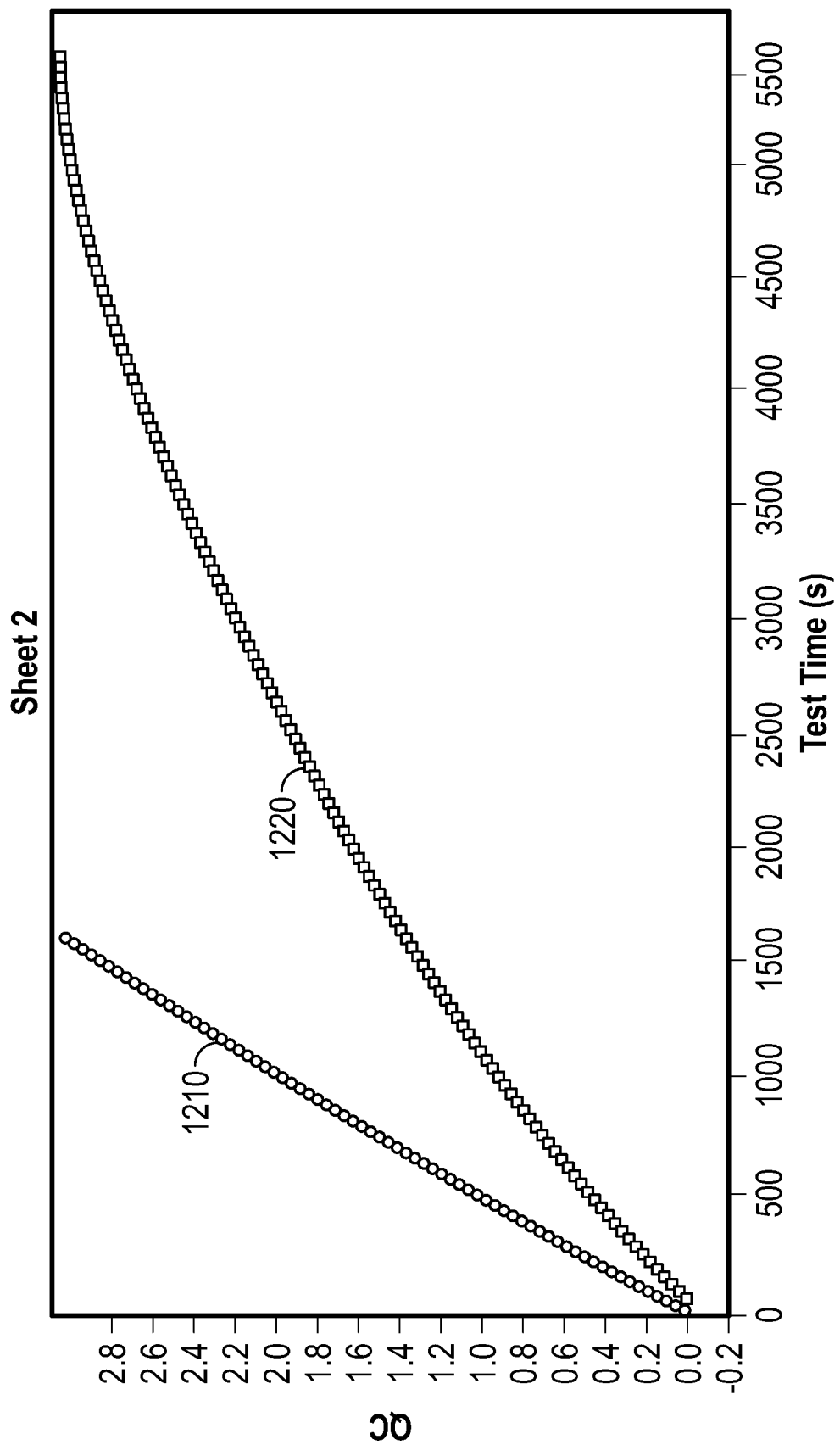
FIG. 12 shows experimental data of charge sequestration for an EC device in the darkened state and an EC device in the bleached state.

FIG. 12 provides more detail for one possible embodiment of the uninterruptible diagnostic step, where there is no user control 1024. In the example embodiment shown, the bleaching occurs for 3 hours in action 1050, and then the potential difference between the cathode and the reference electrode (Vseq) is measured for 3 hours in action 1052. If Vseq is greater than 0.56 V in decision 1030, then the flow branches to the sequestration protocol (which can run in the background) 1034, and the charge Q required to be sequestered is calculated in action 1062. If Vseq is not greater than 0.56 V in decision 1030, then the sequestration protocol will not be run in action 1036, and flow will continue back to normal operation 1010.

Returning to decision 1016, if it is nighttime, then flow will continue to decision 2018. If it is nighttime in decision 1016, and the window is bleached in decision 1018 then flow will continue to the interruptible diagnostic step 1028, and the electrochromic device will undergo a night bleach 3h, which is a 3 hour bleach, in action 1056. During the interruptible diagnostic step, the user is not locked out, and if an action is requested, then the interruptible diagnostic step will be interrupted, and normal operation will resume in action 1010. If the night bleach is finished in decision 1058, then Vseq will be measured for 3 hours in action 1060, and then the flow continues to decision 1030. If the interruptible diagnostic step finishes then flow continues to 1030.

Returning to FIG. 10, if the interruptible diagnostic step finishes in decision 1030, then the flow branches to decision 1032. If sequestration is necessary (e.g., if the Vseq is greater than a predetermined value (e.g., 0.56 V)), then the sequestration protocol will run in the background in action 1034. If sequestration is not necessary, then no sequestration will be run in action 1036, and flow will continue to normal operation 1010.

FIG. 11 shows more details regarding the sequestration protocol running in the background 1034. If the Vseq is greater than a predetermined value (e.g., 0.54 V) in decision 1054, then the sequestration protocol will being running in the background 1034 by first calculating the required amount of charge Q to sequester in action 1062. Some examples of transfer functions that can be used to calculate the amount of charge Q to sequester from a given measured Vseq are shown in FIGS. 6 and 9 discussed above. The amount of charge Q to sequester is then used to determine the number of sequestration steps needed in action 1064. The number of steps needed A1 is calculated by dividing the amount of charge Q to sequester by a predetermined value A2. In some cases, A2 is an amount of charge that can be removed in a single sequestration step without showing a visible gradient in the electrochromic device, or without causing a delta E between different regions in the device greater than a particular value (e.g., 0.75, 1, or 1.25).

Once the number of sequestration steps has been determined in action 1064, the flow continues to decision 1066. If the device is fully bleached (e.g., has undergone a 3 hour bleach with no intervening darkening) then flow branches to action 1068 and the sequestration charge removal will not begin. If the device is not fully bleached (e.g., if it has not undergone a 3 hour bleach with no intervening darkening), then the flow branches to action 1070, and A2 amount of charge is sequestered (e.g., moved from the cathode to the redox element, sequestration material, and/or auxiliary electrode) in a first step. In some embodiments, if the device is fully bleached in 1066, then the device is darkened (e.g., a minimum amount of charge is moved into the cathode) before proceeding to step 1070. After A2 charge is sequestered in a first step in action 1070, the flow proceeds to 1072 where the device is allowed to equilibrate for a predetermined amount of time (e.g., 4 hours). If the predetermined amount of time has not completed, then flow branches to action 1074 to wait for an incremental amount of time (shorter than the predetermined amount of equilibration time used in decision 1072), and then flow proceeds back to 1072. Once the predetermined amount of equilibration time (e.g., 4 hours) has passed, then the flow branches to decision 1076. If the number of steps A1 in the sequestration protocol have not been all completed, then the flow branches back to decision 1066 to determine if the next step can begin. Once the number of steps A1 in the sequestration protocol are all complete, then the flow branches to action 1078 and the protocol ends. After the protocol ends, then flow proceeds to action 1010 where normal operation is resumed.

Example 6

EC Device Sequestration in Bleached and Darkened States

FIG. 12 shows two experimental examples of charge sequestration from EC devices. The EC devices in this example were approximately rectangular in shape, and approximately 75 cm in length, and 130 cm in width. The bus bar for the cathode in each device in this Example was attached to the substrate upon which the cathode was deposited and located along a first of the longer edges of the device. The bus bar for the anode in each device in this Example was attached to the substrate upon which the anode was deposited and located along a first of the longer edges of the device. There were two redox elements in each of the devices in this Example, containing $LiFePO_4$ material, and were each approximately 1 cm wide and 120 cm long. The first redox element for each of the devices in this Example was located on the substrate upon which the cathode was deposited and located along a second of the longer edges of the device (on the edge opposite the cathode bus bar). The second redox element for each of the devices in this Example was located on the substrate upon which the anode was deposited and located along a second of the longer edges of the device (on the edge opposite the anode bus bar). During charge sequestration, a potential was applied between the cathode bus bar and the first redox element and between the cathode bus bar and the second redox element simultaneously.

One of the curves 1210 on the graph in FIG. 12 corresponds to charge sequestration performed when the EC device was in a darkened state. The other curve 1220 on the graph in FIG. 12 corresponds to charge sequestration performed when the EC device was in a bleached state. Both experiments were performed using the same potential between the redox element and the cathode bus bar (0.3 V), and the bias was applied until 3 C of charge was sequestered. The graph in FIG. 12 shows that the charge sequestration occurred more than 3 times more quickly for the device that was in the darkened state compared to the device in the bleached state. 3 C of charge was sequestered from the device in the darkened state in approximately 1600 seconds compared to 5500 seconds for the device in the bleached state.

Example 6

EC Device Excess Charge Generation Rate

Figure 13A:
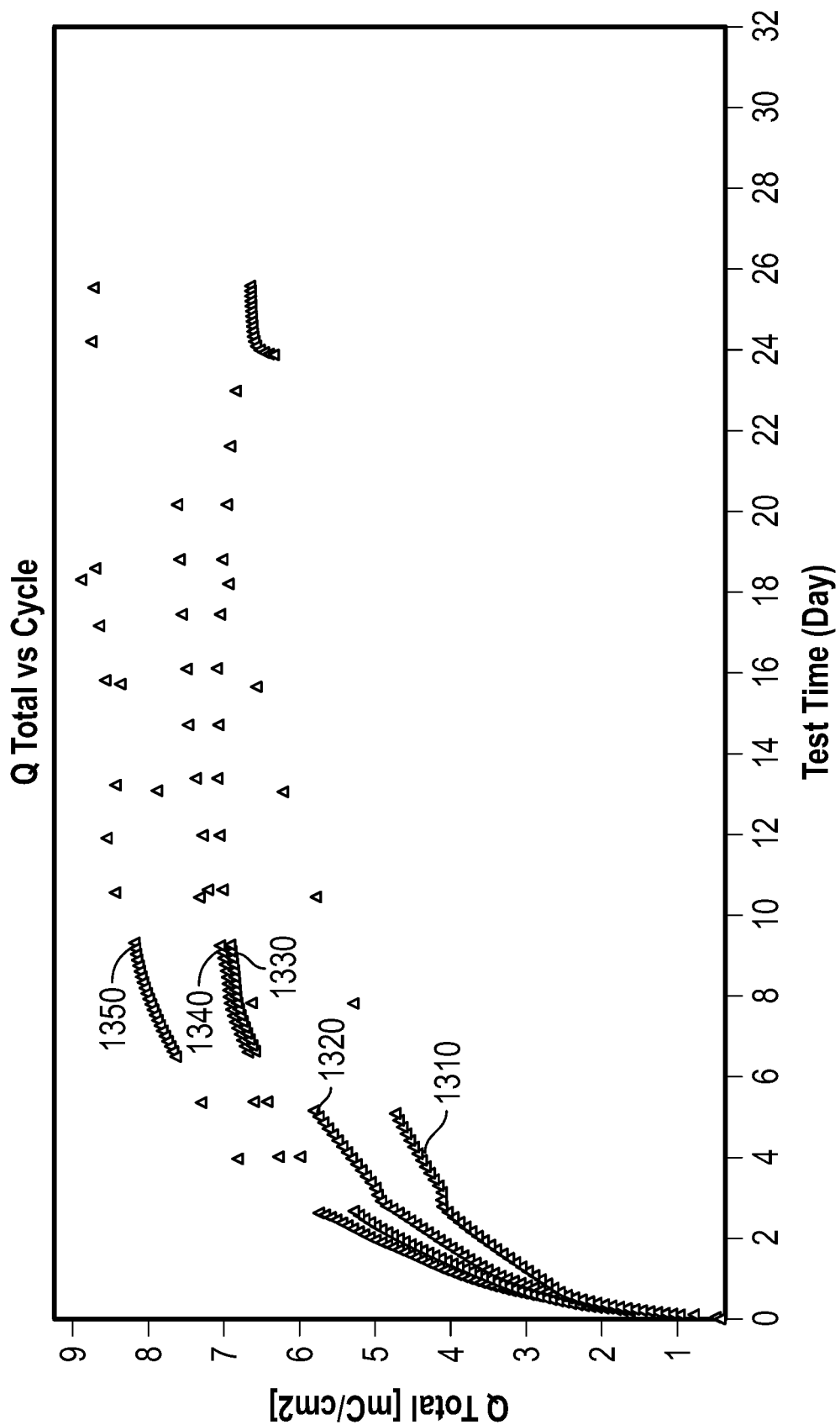
FIGS. 13A and 13B show experimental data of excess charge generation in an EC device in linear and logarithmic scales respectively.
Figure 13B:
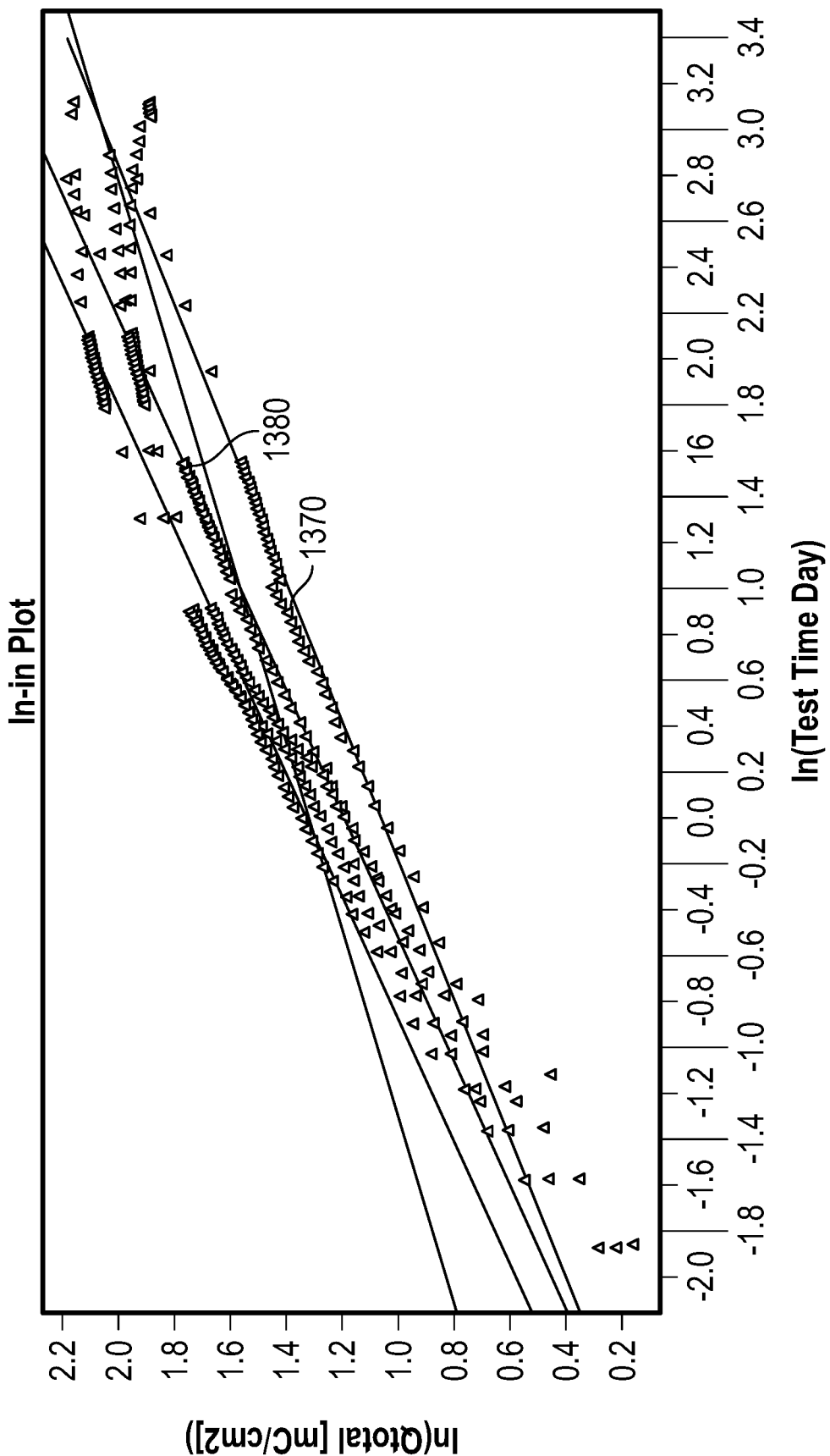

FIGS. 13A and 13B shows experimental examples of excess charge generation in five different EC devices. The EC devices in this example were approximately square in shape, with an active area of approximately 100 $cm^2$. The devices in this Example contained a front cathode (a working cathode), a back cathode (a counter electrode), a first bus bars electrically connected to the front cathode, a second bus bar electrically connected to the back cathode, and a reference electrode with a dedicated electrically isolated bus bar. In portions of the test, the devices were exposed to light while in open circuit voltage conditions, and the illumination approximated the solar spectrum, with an intensity that produced approximately 10× accelerated conditions compared to real world conditions. The testing protocol was as follows. The devices were exposed to illumination, and the excess charge generation would occur. Once per hour the excess charge generated was measured, and was shuttled to the back electrode by applying a potential between the front and back cathodes. The front cathode was then restored to its initial potential using the references electrode as an independent potential measurement. The graph in FIG. 13A shows the amount of charge generated (in $mC/cm^2$) on the y-axis, and the duration of the test (in days) on the x-axis. The two devices with data shown in curves 1310 and 1320 are from a first batch of devices, and the devices with data shown in curves 1330, 1340 and 1350 were from a second batch of devices. Over the duration of the tests, approximately 18-26 days, approximately 7-9 $mC/cm^2$ of excess charge was generated.

FIG. 13B shows the same data for the five devices shown in the graph in FIG. 13A, plotted on a logarithmic scale (the natural logarithm of the charge and the time duration are plotted). The logarithmic data from the two devices from the first batch with data shown in curves 1370 and 1380, were fit well by a logarithmic model. It is projected that these devices would have approximately 50-60 $mC/cm^2$ excess charge generated over the lifetime of the product. The logarithmic data from the two devices from the first batch did not fit well to a logarithmic model, and no determination of excess charge generation over the lifetime of the devices was made.

The total amount of excess charge generated by an electrochromic device is important because it will determine the charge capacity of the redox element that is required for a given device. For example, for a device that is 75 cm in length, and 130 cm in width, with an area of 9750 $cm^2$, the total excess charge generated over the lifetime of the device would be approximately 500 C to 600 C. Therefore, a redox element would need to be able to hold more than 500 C of charge in order to sequester all of the excess charge generated within the device over the lifetime of the device.

Figure 14:
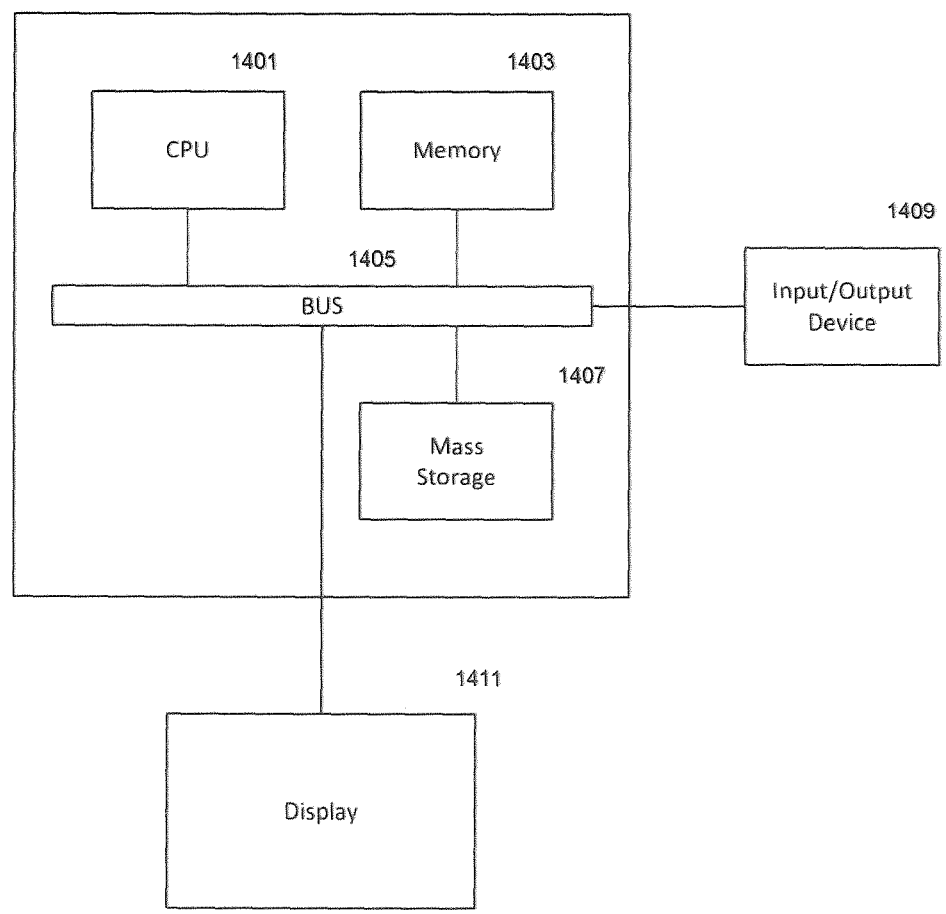
FIG. 14 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 14 is an illustration showing an exemplary computing device which may implement the embodiments described herein. The computing device of FIG. 14 may be used to perform embodiments of the functionality for controlling smart windows in accordance with some embodiments. The computing device includes a central processing unit (CPU) 1401, which is coupled through a bus 1405 to a memory

1403, and mass storage device 1407. Mass storage device 1407 represents a persistent data storage device such as a floppy disc drive or a fixed disc drive, which may be local or remote in some embodiments. Memory 1403 may include read only memory, random access memory, etc. Applications resident on the computing device may be stored on or accessed via a computer readable medium such as memory 1403 or mass storage device 1407 in some embodiments. Applications may also be in the form of modulated electronic signals modulated accessed via a network modem or other network interface of the computing device. It should be appreciated that CPU 1501 may be embodied in a general-purpose processor, a special purpose processor, or a specially programmed logic device in some embodiments.

Display 1411 is in communication with CPU 1401, memory 1403, and mass storage device 1407, through bus 1405. Display 1411 is configured to display any visualization tools or reports associated with the system described herein. Input/output device 1409 is coupled to bus 1405 in order to communicate information in command selections to CPU 1401. It should be appreciated that data to and from external devices may be communicated through the input/output device 1409. CPU 1401 can be defined to execute the functionality described herein to enable the functionality described with reference to FIGS. 1-13. The code embodying this functionality may be stored within memory 1403 or mass storage device 1407 for execution by a processor such as CPU 1401 in some embodiments. The operating system on the computing device may be MS DOS™, MS-WINDOWS™, OS/2™ UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    a) providing an electrochromic device comprising:
        a first electrode comprising an electrochromic material;
        a second electrode;
        a redox element comprising a sequestration material and an auxiliary electrode material; and
        a reference electrode comprising a consistent potential with respect to $Li^+/Li$ over time;
    b) applying a first electrical potential between the first and the second electrodes until the electrochromic device is in a fully bleached state;
    c) measuring a first open circuit voltage between the first electrode and the reference electrode in the electrochromic device in the fully bleached state;
    d) calculating a charge Q to return the first electrode to a baseline state based on the first open circuit voltage measured in step c);
    e) applying a second electrical potential between the first and second electrodes until the electrochromic device is in a darkened state; and
    f) applying a third electrical potential between the first electrode and the redox element to transfer charge from the first electrode in the darkened state to the redox element.

2. The method of claim 1, wherein the transferring charge from the darkened first electrode to the redox element comprises N cycles, each cycle comprising:
    a first step transferring a Q/N charge from the first electrode in the darkened state to the redox element; and
    a second step allowing the electrochromic device to equilibrate.

3. The method of claim 2, wherein the duration of time transferring the charge Q/N is from 10 seconds to 1 min.

4. The method of claim 2, wherein the duration of time for the electrochromic device to equilibrate is from 10 min to 2 hours.

5. The method of claim 2, wherein the number of cycles N is from 10 to 100.

6. The method of claim 2, wherein the rate at which charge is moved from the first electrode to the redox element is from 10 mA to 10 A.

7. The method of claim 1, further comprising measuring a second open circuit voltage between the first electrode and the second electrode before measuring the first open circuit voltage between the first electrode and the reference electrode in the electrochromic device in the fully bleached state.

8. The method of claim 1, further comprising:
    providing a smart window system comprising:
        the electrochromic device, wherein the electrochromic device is an electrochromic smart window; and
        a processor; and
    providing instructions from a cloud network to the electrochromic smart window to perform steps b) through f) within the electrochromic smart window.

9. The method of claim 8, wherein the providing of instructions from the cloud network comprises:
    contacting a smart gateway device in the smart window system, wherein the smart gateway device identifies a smart driver associated with the electrochromic device within the smart window system; and
    communicating the instructions from the cloud network to the smart driver through the smart gateway to perform steps b) through f).

10. The method of claim 8, wherein the transferring charge from the darkened first electrode to the redox element comprises N cycles, each cycle comprising:
    a first step transferring a Q/N charge from the first electrode in the darkened state to the redox element; and
    a second step allowing the electrochromic device to equilibrate.

11. The method of claim 9, wherein the instructions to perform steps b) through f) are stored on the processor on the smart driver.

12. The method of claim 9, wherein the instruction to perform steps b) through f) are stored on the processor on the smart gateway.

13. The method of claim 8, wherein the system of smart windows comprises a group of smart windows wherein the baseline state of each of the smart windows within the group is the same.

14. The method of claim 8, wherein the smart window system comprises a plurality of electrochromic devices and wherein the baseline state of each of the plurality of electrochromic devices is the same.

* * * * *